US012463653B2

(12) United States Patent
Kussian

(10) Patent No.: US 12,463,653 B2
(45) Date of Patent: Nov. 4, 2025

(54) DEVICES, SYSTEMS, AND METHODS FOR DIGITAL FILTERING

(71) Applicant: Infineon Technologies AG, Neubiberg (DE)

(72) Inventor: Reinhard Kussian, Klagenfurt (AT)

(73) Assignee: Infineon Technologies AG, Neubiberg (DE)

( * ) Notice: Subject to any disclaimer, the term of this patent is extended or adjusted under 35 U.S.C. 154(b) by 218 days.

(21) Appl. No.: 18/310,605

(22) Filed: May 2, 2023

(65) Prior Publication Data

US 2023/0361778 A1 Nov. 9, 2023

(30) Foreign Application Priority Data

May 4, 2022 (DE) ...................... 10 2022 110 990.9

(51) Int. Cl.
*H03M 1/06* (2006.01)
*G06F 7/544* (2006.01)
*H03M 1/12* (2006.01)

(52) U.S. Cl.
CPC ........ H03M 1/0626 (2013.01); G06F 7/5443 (2013.01); H03M 1/1245 (2013.01)

(58) Field of Classification Search
CPC .. H03M 1/0626; H03M 1/1245; G06F 7/5443
USPC .................................................. 341/155, 118
See application file for complete search history.

(56) References Cited

U.S. PATENT DOCUMENTS

| 6,618,739 | B1* | 9/2003 | Gonikberg | H03H 17/06 708/319 |
| 2003/0145030 | A1* | 7/2003 | Sheaffer | G06F 9/3001 712/E9.071 |
| 2006/0195498 | A1* | 8/2006 | Dobbek | G06F 9/3001 712/E9.032 |
| 2008/0229075 | A1* | 9/2008 | Froemming | G06F 9/342 712/210 |

OTHER PUBLICATIONS

B.K. Anantha Ramu, "Implementing FIR and IIR Digital Filters Using PIC18 Microcontrollers", Published 2002.

* cited by examiner

*Primary Examiner* — Peguy Jean Pierre
(74) *Attorney, Agent, or Firm* — Eschweiler & Potashnik, LLC

(57) ABSTRACT

A digital filtering device includes at least one processor, a sample buffer configured to store samples, the sample buffer being a circular buffer, and a coefficient array for storing coefficients of a digital filter. The coefficient array includes a set of digital filter coefficients and a copy of the set of coefficients. For each of a plurality of input samples, the at least one processor can obtain a sample and store the sample as a value in a sample buffer at a position indicated by a buffer pointer, calculate an output sample comprising to perform a multiply-accumulate (MAC) operation with values currently stored in the sample buffer and a subset of the coefficients stored in a coefficient array, wherein a position of the subset of coefficients in the coefficient array is indicated by a coefficient pointer; and update the buffer pointer and the coefficient pointer.

20 Claims, 20 Drawing Sheets $y_0 = x_0 * c_0 + R2 * c_3 + R1 * c_2 + R0 * c_1$ $$y_3 = x_0*c_3 + x_1*c_2 + x_2*c_1 + x_3*c_0$$

$$y_4 = x_4 * c_0 + x_1 * c_3 + x_2 * c_2 + x_3 * c_1$$

```
const int NUM_TAPS = 8;

q31_t coeff[NUM_TAPS*2-1] =
{C7,C6,C5,C4,C3,C2,C1,C0,C7,C6,C5,C4,C3,C2,C1};

q31_t buffer[NUM_TAPS];

int mem_index = 0;
volatile q31_t *input = (q31_t *) 0x8010;
volatile q31_t *output = (q31_t *) 0x8020;

int main(int argc, char *argv[]){

// GENERAL SETUP ==========================================
    memset((void *)buffer,0,sizeof(buffer));
    // EXECUTE ALGORITHMS ==================================
    do {
        // READ DATA FROM MEMORY ===========================
        q31_t x = *input;
        // EXECUTE FIR =====================================
        // shift phase
        buffer[mem_index] = x;

// calculation phase
        accum72_t acc = create_a72(0,0);
        for (int k = 0; k < NUM_TAPS; k++) {
            acc = a72_mac_q31(acc, buffer[k],
coeff[k+(NUM_TAPS-1-mem_index)]);
        }
        q31_t y = q31_cast_a72(acc, 16);
        // WRITE RESULT IN MEMORY ==========================
        *output = y;

// Circular buffer emulation
        mem_index = (mem_index == NUM_TAPS - 1) ? 0 :
mem_index + 1;
        // WAIT FOR WAKE-UP EVENT ==========================
        _wevt(0);
    } while(1);

return 0;
}
```

```
const int NUM_TAPS = 8;
q31_t coeff[NUM_TAPS*2-1] = {C6,C5,C4,C3,C2,C1,C0,C7,
C6,C5,C4,C3,C2,C1,C0};
q31_t buffer[NUM_TAPS];

int mem_index = 0;
volatile q31_t *input = (q31_t *) 0x8010;
volatile q31_t *output = (q31_t *) 0x8020;

int main(int argc, char *argv[]){

// GENERAL SETUP ====================================
    memset((void *)buffer,0,sizeof(buffer));
    // EXECUTE ALGORITHMS ===========================
    do {
        // READ DATA FROM MEMORY ====================
        q31_t x = *input;
        // EXECUTE FIR ==============================

// shift phase
        buffer[mem_index] = x;

// Circular buffer emulation
        mem_index = (mem_index == NUM_TAPS - 1) ? 0 :
mem_index + 1;

// calculation phase
        accum72_t acc = create_a72(0,0);
        for (int k = 0; k < NUM_TAPS; k++) {
            acc = a72_mac_q31(acc, buffer[k],
coeff[k+(NUM_TAPS-1-mem_index)]);
        }
        q31_t y = q31_cast_a72(acc,16);
        // WRITE RESULT IN MEMORY ===================
        *output = y;

// WAIT FOR WAKE-UP EVENT =======================
        _wevt(0);

} while(1);

return 0;
}
```

DEVICES, SYSTEMS, AND METHODS FOR DIGITAL FILTERING

REFERENCE TO RELATED APPLICATIONS

This application claims priority to German Patent Application 10 2022 110 990.9, filed on May 4, 2022. The contents of the above-referenced Patent Application is hereby incorporated by reference in its entirety.

TECHNICAL FIELD

Various embodiments generally relate to digital filters and implementing digital filters.

BACKGROUND

The term Von Neumann bottleneck describes the performance limitation which is given by a processor architecture including a control unit, arithmetic logic unit (ALU), registers, and memory. It is the effect of a discrepancy in processing speed between these different parts of the processor leading to idle times and stalls. A prominent example is the difference in processing speed of ALU operations and memory access. This might be due to a load-store architecture, where the ALU is forced to wait for data being loaded from the memory into a register or for data being stored from a register into the memory. In general, due to these properties, it is of interest to limit memory accesses as much as possible.

Many digital signal processors (DSPs) have dedicated multiply-accumulate (MAC) units available, but other processors do not. The latter suffer even more from the Von Neumann bottleneck due to the need of executing complex operations by multiple single instructions. Two examples how they suffer more:

A MAC instruction has to be split up into a multiplication instruction followed by an addition, whereby for each of the instructions, the operand and result registers might be occupied (e.g. in the case of a load-store architecture). Two instructions need to be fetched, decoded and executed, which could lead to stalls if they are executed consecutively.

Due to a lack of dedicated multiplication units in a lot of processors, an ALU executes a multiplication by add and shift operations, which takes usually longer than having a dedicated multiplication unit.

In a load-store architecture a dedicated MUL/MAC unit, does not necessarily solve the bottleneck issue. This is because since multiple memory operations can cause unfavorable stalls and operands have to be loaded into or stored from registers as well. Hence, the register files are an important factor when dealing with the bottleneck. The fewer memory accesses are required, the lesser the bottleneck will have an impact. The more and the longer required data can be stored in the registers, the fewer memory accesses are required since the data has not to be shifted frequently between registers and memories.

Furthermore, to cope with the above aspects, caching might be used, but there are issues in terms of availability and licensing considerations.

Instead, improving existing algorithms might be the more inexpensive option. An algorithm might suit the timing requirements better if it is tuned to need fewer data and pointers, need fewer load and store operations, need fewer operations, or omit frequent (re)writing of registers. This can be especially true for algorithms, such as FIR algorithms. The bottleneck in regards of FIR algorithms is strongly depending on the processor architectures. The stricter the requirements on cycle performance and area, the more interest is given to have fast algorithms for the computation of FIR filters.

BRIEF DESCRIPTION OF THE DRAWINGS

In the drawings, like reference characters generally refer to the same parts throughout the different views. The drawings are not necessarily to scale; emphasis instead generally being placed upon illustrating the principles of the invention. In the following description, various embodiments of the invention are described with reference to the following drawings, in which:

FIGS. 5-6 each include exemplary sample code for implementing a digital filter according to at least one exemplary embodiment of the present disclosure.

DESCRIPTION

Figure 1:
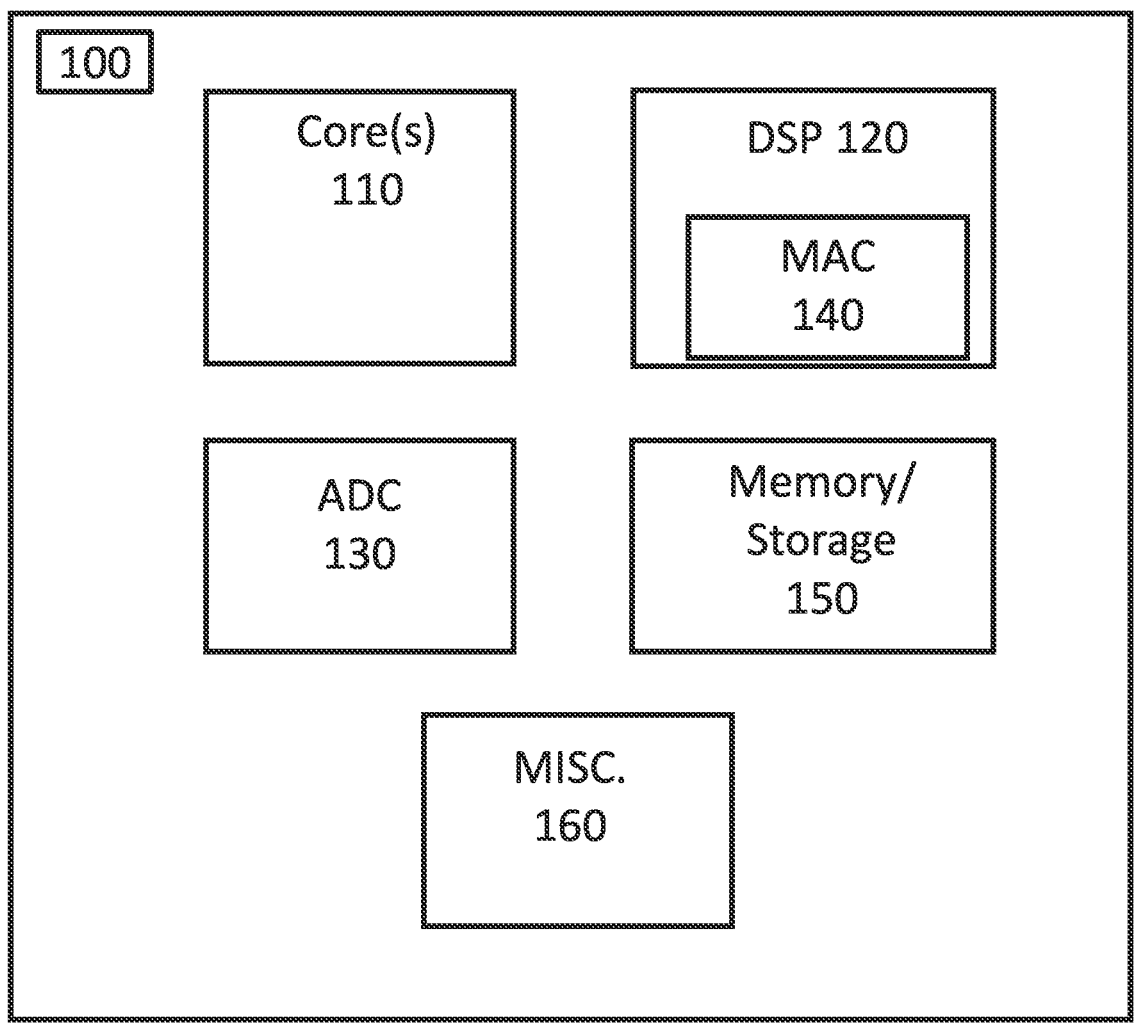
FIG. 1 include a diagram illustrating a processing or computing device according to at least one exemplary embodiment of the present disclosure.

The following detailed description refers to the accompanying drawings that show, by way of illustration, specific details and embodiments in which the invention may be practiced.

The word "exemplary" is used herein to mean "serving as an example, instance, or illustration." Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set (of)", "collection (of)", "series (of)", "sequence (of)", "grouping (of)", etc., and the like in the description or in the claims refer to a quantity equal to or greater than one, i.e., one or more. Any term expressed in the plural form that does not expressly state "plurality" or "multiple" likewise refers to a quantity equal to or greater than one. The terms "proper subset", "reduced subset", and "lesser subset" refer to a subset of a set that is not equal to the set, i.e., a subset of a set that contains fewer elements than the set.

The terms "at least one" and "one or more" may be understood to include a numerical quantity greater than or equal to one (e.g., one, two, three, four, [. . . ], etc.).

As used herein, unless otherwise specified, the use of the ordinal adjectives "first", "second", "third", etc., to describe a common object merely indicate that different instances of like objects are being referred to, and are not intended to imply that the objects so described must be in a given sequence, either temporally, spatially, in ranking, or in any other manner.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in the form of a pointer. However, the term data is not limited to the aforementioned examples and may take various forms and represent any information as understood in the art.

The term "processor" or "controller" as, for example, used herein may be understood as any kind of entity that allows handling data, signals, etc. The data, signals, etc., may be handled according to one or more specific functions executed by the processor or controller.

A processor or a controller may thus be or include an analog circuit, digital circuit, mixed-signal circuit, logic circuit, processor, microprocessor, Central Processing Unit (CPU), Neuromorphic Computing Unit (NCU), Graphics Processing Unit (GPU), Digital Signal Processor (DSP), Field-Programmable Gate Array (FPGA), integrated circuit, Application-Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, signal processor, Central Processing Unit ("CPU"), Graphics Processing Unit ("GPU"), Neuromorphic Computing Unit (NCU), Digital Signal Processor ("DSP"), Field-Programmable Gate Array ("FPGA"), integrated circuit, Application-Specific Integrated Circuit ("ASIC"), etc., or any combination thereof. Any other kind of implementation of the respective functions, which will be described below in further detail, may also be understood as a "circuit." It is understood that any two (or more) of the circuits detailed herein may be realized as a single circuit with substantially equivalent functionality. Conversely, any single circuit detailed herein may be realized as two (or more) separate circuits with substantially equivalent functionality. Additionally, references to a "circuit" may refer to two or more circuits that collectively form a single circuit.

As utilized herein, terms "module", "component", "system", "circuit", "element", "interface", "slice", "circuitry", and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more".

As used herein, a "signal" may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in a computer-readable storage medium prior to its receipt by the receiving component. The receiving component may retrieve the signal from the storage medium. Further, a "value" that is "indicative of" some quantity, state, or parameter may be physically embodied as a digital signal, an analog signal, or stored bits that encode or otherwise communicate the value.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electromagnetic wave in the other element without physical contact or intervening components. Further, when a voltage, current, or signal is referred to as being "applied" to an element, the voltage, current, or signal may be conducted to the element by way of a physical connection or by way of capacitive, electromagnetic, or inductive coupling that does not involve a physical connection.

As used herein, "memory" is understood as a non-transitory computer-readable medium where data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory and thus may refer to a collective component comprising one or more types of memory. Any single memory component may be separated into multiple collectively equivalent memory components and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

Exemplary embodiments of the present disclosure may be realized by one or more computers (e.g., computing devices/processors) reading out and executing computer-executable instructions recorded on a storage medium (e.g., non-transitory computer-readable storage medium) to perform the functions of one or more of the herein-described embodiment(s) of the disclosure. The computer(s) may comprise one or more of a central processing unit (CPU), a micro-processing unit (MPU), or other circuitry, and may include a network of separate computers or separate computer processors. The computer-executable instructions may be provided to the computer, for example, from a network or a non-volatile computer-readable storage medium. The storage medium may include, for example, one or more of a hard disk, a random-access memory (RAM), a read-only memory (ROM), a storage of distributed computing systems, an optical drive (such as a compact disc (CD), digital versatile disc (DVD), or Blu-ray Disc (BD), a flash memory device, a memory card, and the like. By way of illustration, specific details and embodiments in which the invention may be practiced.

FIG. 1 includes a diagram illustrating a processing or computing device 100. In one example, the processing device 100 may be a microcontroller or microcontroller unit (MCU). The processing device 100 may include one or more cores 110, which may be processor or central processing unit (CPU) cores that can perform one or more operations by executing program instructions or software. Such instructions may be stored or located on a (non-transitory) computer readable storage medium, located in the processing device 100 (e.g., memory/storage 150).

Similarly, the processing device 100 can include a DSP 120 for performing digital signal processing. The DSP, like the cores 110, may perform operations by executing program instructions.

The device 100 can also include an analog-to-digital converter (ADC) 130. For example, the ADC may receive analog input from one or more sources either on the device 100 or external to the device 100, e.g., a sensor, port, etc. The ADC converts analog input into discrete samples or digital output, which can then be provided to other components of the processing device 100.

The device 100 can include one more memories and/or storage devices 150 for storing data, instructions, etc. and can further include other components not mentioned, MISC 160. Such other components may include sensors, controllers, interfaces, ports or other types of circuitry. Connections between the components of the processing device 100 may be assumed although they are not depicted in FIG. 1.

Figure 2:
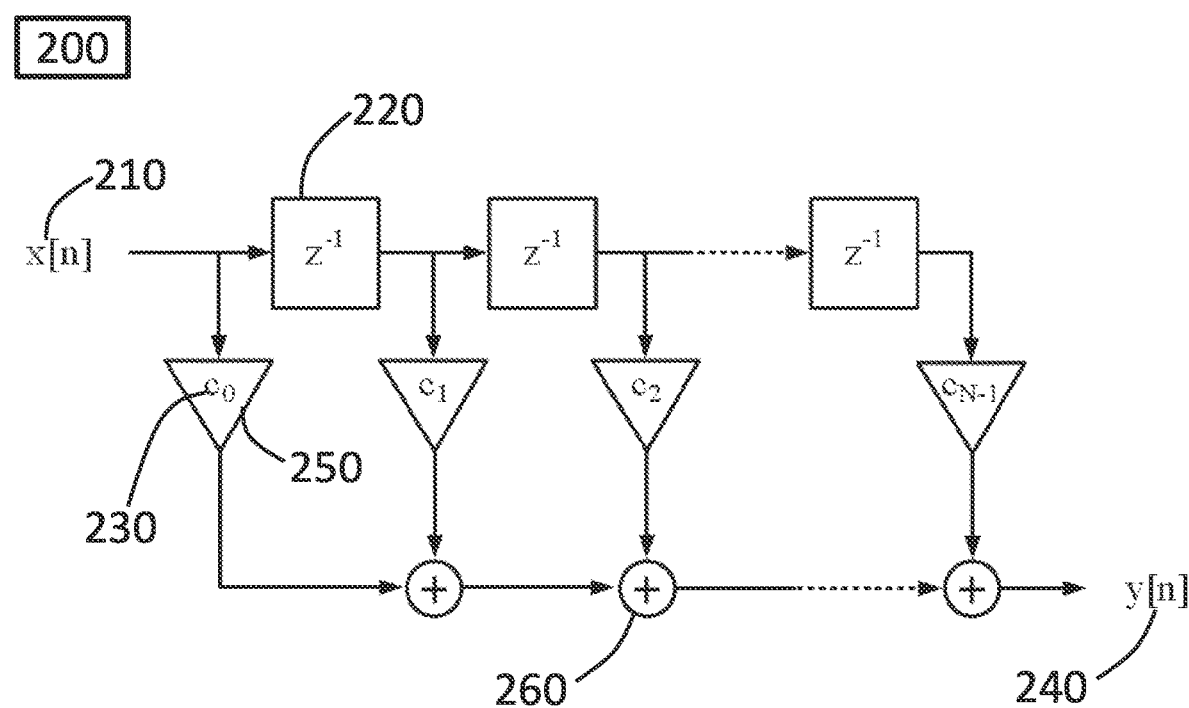
FIG. 2 is a diagram of a finite impulse response (FIR) filter.

FIG. 2 shows illustrates a diagram of a finite impulse response (FIR) filter 200. The input or input values 210 (x[n]) are processed using the taps/delays 220 and coefficients ($c_0$-$c_{N-1}$) 230. That is, a series of multiple multiplication 250 and addition 260 operations are implemented to produce a filter output or output values 240 (y[n]), where n is the index of input sample or input signal, or output signal.

The FIR filter 200 is of order N-1. Accordingly, the filter 200 includes N number of delays 220 ($z^1$) and therefore, N-1 old input values and one (1) current input value is required to produce a single filter output or output value. The inputs or input values can be stored together in a memory, for example, consecutively.

The filter 200 is a FIR filter, but not often implemented as shown. This is because of the need to shift every storage element one place to the right each time an output sample was computed. Given a 100-tap FIR filter of this formation, 100 samples need to be shifted, 100 products and 99 additions need to be made, which is very burdensome computationally.

FIGS. 3A-3M illustrate a process or procedure 300 for implementing a digital filter according to at least one exemplary embodiment of the present disclosure. In at least one example, the digital filter being implemented may be a finite impulse response (FIR). In other cases, other types of digital filters may be implemented such as an infinite impulse response (IIR) filter in one example.

The process 300 may be implemented by one or more processors executing instructions stored or contained in a non-transitory computer readable medium. Further, the one or more processors may be a digital signal processor (DSP). The one or more processors may include or use a multiply-accumulate (MAC) unit in the process 300. For example, the processing device 100 of FIG. 1 may use the DSP 120 to implement the filter process 300. In other cases, other types of computing devices, that may or may not include a DSP or a MAC, may be used.

Figure 3A:
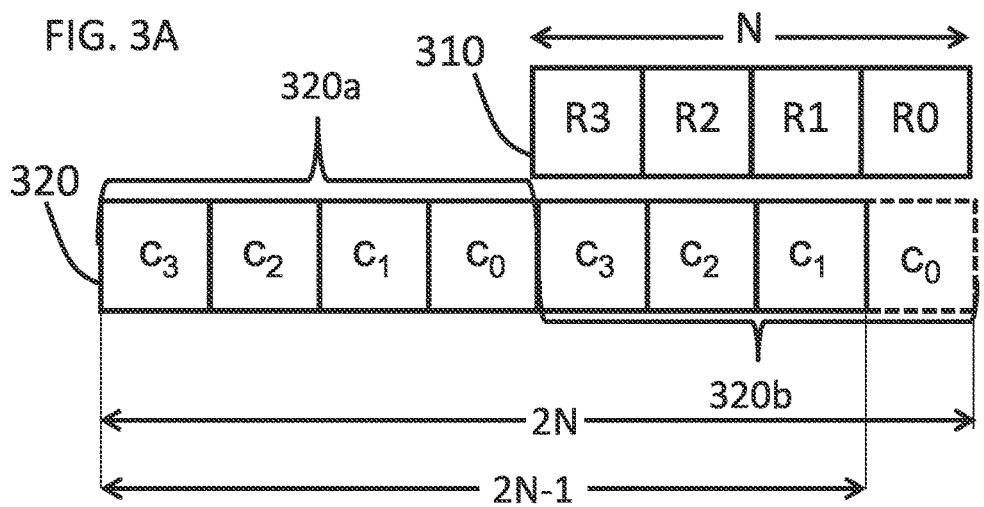
FIGS. 3A-3M depict a process for implementing a digital filter according to at least one exemplary embodiment of the present disclosure.

As shown in FIG. 3A, a sample buffer 310 may be provided and used for the process 300. The sample buffer 310 may be realized as a data structure in a part or section of memory or storage and can be used or configured for storing discrete input samples or input values. In this example, the digital filter can be an N-tap filter and therefore the sample buffer 310 can store N elements or be considered as N elements in length. Specifically, in the example of FIGS. 3A-3M, N is equal to 4.

Input samples/values may be obtained from any suitable source and then stored, e.g., as a value or data, in the sample buffer 310. For example, the input samples can be obtained from an analog-to-digital converter (ADC) that converts or samples an analog signal to provide the discrete output in the form of digital samples. In other cases, the input samples may be obtained from other sources or devices including down-sampling components or circuits. For example, a down-sampling device or circuit may down-sample samples from the ADC and then provide as input samples.

In some instances, the sample buffer 310 may be initialized or reset to include a series of initial or reset values R (R0-R3) (sometimes referred to herein as reset samples). That is, after initialization or a reset of the sample buffer 310 and/or the process 300, the reset values R may be stored in the sample buffer 310.

According to at least one exemplary embodiment of the present disclosure, the sample buffer 310 is realized or implemented as a circular buffer, e.g., where the ends or end elements of the buffer are connected or linked, end-to-end. The sample buffer 310 can be a circular buffer realized by software, firmware, or hardware, to name a few.

Further, as shown in FIG. 3A, a coefficient array 320 may also be provided and used for the process 300. The coefficient array 320 can also be realized as a data structure within or as a part or section of memory or storage and stores coefficients for a digital filter.

According to at least one exemplary embodiment of the present disclosure, the coefficient array 320 includes a set of coefficients 320a for the digital filter. The set of coefficients 320a can be a full or complete set, that is include each coefficient ($c_0$-$c_{N-1}$) for the digital filter.

Further, the coefficient array 320 of FIG. 3A includes a copy of the set of coefficients 320b (copy set). The copy set of coefficients 320b may be a full or partial copy of the set of coefficients 320a. As will be explained or shown, if the copy of coefficients 320b is a full copy and includes all the coefficients of the set of coefficients 320a, not all of these coefficients may be used or needed. For example, in FIG. 3A, the coefficient, $c_0$, stored at last element or right end of the coefficient array 320 (enclosed in dashed line) does not need to be used in the process 300.

In general, for an N-tap filter, there are N coefficients ($c_0$-$c_{N-1}$), and the set of coefficients 320a is also of length N. The copy of coefficients 320b can also be of length N when it is a full or complete copy of the set coefficients. In this cases, the length of the coefficient array 320 is 2N, as shown in FIG. 3A.

In other instances, where the copy of coefficients 320b is not a complete copy of the set of coefficients 320a. For example, if the copy set of coefficients 320b does not include one of the coefficients of the set of coefficients 320a (e.g., $C_0$), then the length of the copy set of coefficients is N-1, and the length the coefficient array is 2N-1.

As shown in FIG. 3A, the set of coefficients 320a and the copy set of coefficients 320b can be located adjacent or next to each other in the coefficient array. Coefficients of the coefficient array 320 can be arranged consecutively in ascending or descending coefficient order. For example, as shown in FIG. 3A, the coefficient $c_3$ (having an order of 3) is next to coefficient $c_2$ (having an order of 2).

According to at least one exemplary embodiment of the present disclosure, the digital filter or digital filtering process 300 can be implemented using pointers and pointer operations.

In FIGS. 3B-3M, the buffer pointer BP is an object that can point, indicate, or have the address or position of an element of the sample buffer 310 and the coefficient pointer CP is an object that can point, indicate, or have the address or position of an element of the coefficient array 320. Further, in some examples described including with respect to the process 300 the buffer pointer BP may be constructed or determined from the coefficient pointer CP or vice versa. For example, the position of the coefficient may be indicated by a modification to the buffer pointer BP (modified BP). Alternatively, the address of the sample in the buffer may be a modification to the coefficient pointer CP (modified CP). As in other aspects described herein, these modifications may be done in or realized by code or program instructions.

According to examples described herein, buffer pointer BP can move according to the connection or structure of the sample buffers, which can be circular buffers. As such, in the case of circular buffers, an advancement of a buffer pointer BP within a sample buffer can cause the buffer pointer to mimic the connection of the circular and therefore successively move from one boundary or end portion to the other. For example, the buffer pointer in moving may successively advance from a start position to a last portion of a sample buffer, or vice versa.

According to various embodiments of the present disclosure, the purpose of the buffer pointer, such as the buffer pointer BP, can be to point to the oldest input sample in the sample buffer, and thus can be updated or changed after or in response to values or samples of the sample buffering changing or being updated.

Figure 3B:
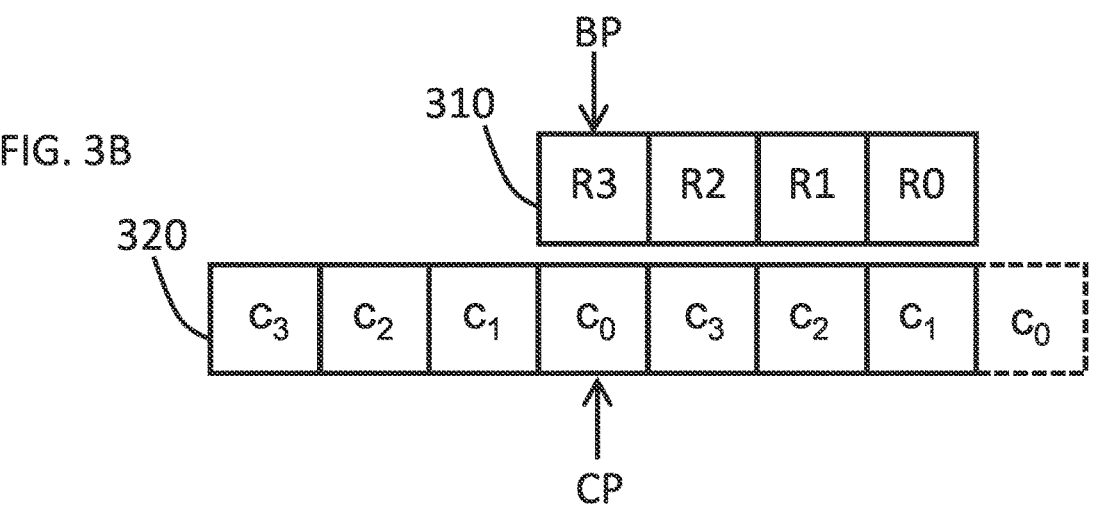

An initialization or reset to the digital filter process can result in the sample buffer shown in FIGS. 3A-3B. That is, the sample buffer 310 includes the reset values (R0-R3), the buffer pointer BP is set or reset to a predefined initial position of the sample buffer. Further, as shown FIG. 3B, the predefined initial position to which the buffer pointer BP is reset is the first buffer element, which in this case is the left most element of the sample buffer 310.

In other examples wherein the samples of the sample buffer are stored or arranged differently, the initial or reset position of the buffer pointer BP may be different, and for example, may be a last or right most element of the sample buffer 310.

Similarly, in response to an initialization or reset, the coefficient pointer CP can be set to a predefined initial position of the coefficient array 320. In the example of FIG. 3B, the initial position of the coefficient pointer CP is set, in this example, to the lowest order coefficient ($c_0$). More specifically, it is set to the first lowest order coefficient (from left to right) in the coefficient array 320.

After the sample buffer 310 has been initialized or reset as shown in FIG. 3A, and after the buffer pointer BP and coefficient pointer CP have been set or initialized as shown in FIG. 3B, a first input sample $x_0$ may be obtained. The first input sample, $x_0$, is obtained and stored in the sample buffer at the position indicated by the buffer pointer BP, the left most position/element.

After storing the first input sample $x_0$, the process 300 includes generating or determining a filter output. The filter output $y_0$ is calculated based on the current samples/values in the sample buffer 310, which includes the initial sample $x_0$ and the reset values R0-R2. More specifically, the filter output $y_0$ is produced by a multiply-accumulate (MAC) operation using the current values of the sample buffer 310 and a specified subset of the coefficients in the coefficient array 320.

Herein, unless otherwise stated or indicated, a subset refers to less than all of a set. For example, the subset of coefficients is less than all of the coefficients stored of the coefficient array 320.

Figure 3C:
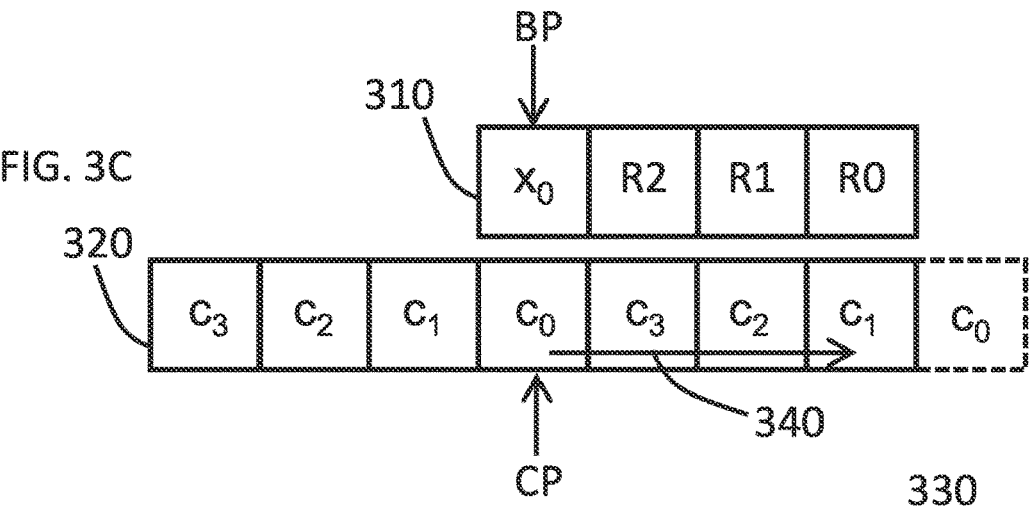

Accordingly, as shown in FIG. 3C, the filter output is indicated by the equation 330:

$$y_0 = x_0 * c_0 + R2 * c_3 + R1 * c_2 + R0 * c_1$$

Determining the filter output $y_0$ includes multiplying the current values of the sample buffer 310 with corresponding coefficients of the coefficient array 320. Again, the corresponding coefficients are a subset of the coefficients stored in the coefficient array but would include at one of each coefficient for a digital filter. That is, one of the coefficients $c_0$-$c_3$ are used. The coefficient pointer CP indicates the subset, e.g., by indicating a beginning or end of the subset of corresponding coefficients. That is, the coefficients of subset of corresponding coefficients are located sequentially or in consecutive positions in the coefficient array 320.

Accordingly, the multiplication operation includes multiplying the sample/value of first element (left most element) of the sample buffer 310 and the coefficient in coefficient array 320 located at the position indicated by the coefficient pointer CP. Therefore, $x_0$, the most recently stored value, which is stored in the first element, is fetched and is to be multiplied with the coefficient $c_0$, fetched from the position of the coefficient array 320 indicated by the coefficient pointer CP. The other samples of the coefficient array 320 are multiplied similarly. That is, the multiplication operation progresses as the remaining values of the sample buffer 310 and their corresponding coefficients in the coefficient array 320 are multiplied. The value R2, stored in the second element, which is in a succeeding or successive to first element of the sample buffer 310, can be fetched and multiplied with the coefficient $c_3$, which is fetched from a next successive or succeeding position away from the position in the coefficient array 320 indicated by the coefficient pointer CP.

The value R1, located at a next successive position/element, the third element from the left of the sample buffer 310, is fetched and is multiplied with the coefficient $c_2$ which is fetched from at next successive or succeeding position away from the coefficient pointer CP. Finally, in this example, the value, R0 stored at the next successive or succeeding element or the fourth element of the sample buffer 310, is fetched and is multiplied with the coefficient $c_1$ which is fetched from at next successive or succeeding position away from the position indicated by the coefficient pointer CP.

For purposes of explanation, FIG. 3C shows the sample buffer 310 aligned with the subset of coefficients in the coefficient array 320 to show the correspondence in the MAC operation. As indicated by the arrow 340, the multiplication process traverses or occurs in a single direction with respect to the sample buffer 310 and the coefficient array 320. The traversal direction 340 shows how the values of the sample buffer 310 are to align or correspond with a subset of coefficients. In the example of FIGS. 3A-3M, the traversal direction 340 is left to right. As such, the traversal of multiplication begins at in the first or left most position/element of the sample buffer 310 and begins with the position/element of the coefficient array 320 indicated by the coefficient pointer CP. However, in other examples, the traversal direction may be different (e.g., right to left) where the samples of the sample buffer 310 and/or the coefficients of the coefficient array 320 are stored or arranged differently.

After multiplying the values of the sample buffer 310 respectively with coefficients (e.g., a subset of coefficients) of the coefficient array 320, an addition operation is implemented in which the multiplicative products produced are added, summed, or accumulated together. The result is a filter output ($y_0$) from the digital filter.

The filter output ($y_0$) and other filter outputs described herein may be calculated using a DSP (or other processor) that includes a multiply-accumulate (MAC) unit. The MAC unit can more quickly or efficiently perform the MAC operation by taking the values of the sample buffer 310 as one operand, and the subset of coefficients (indicated by the coefficient pointer CP) as a second operand and produce an output as indicated by the equation 330.

Figure 3D:
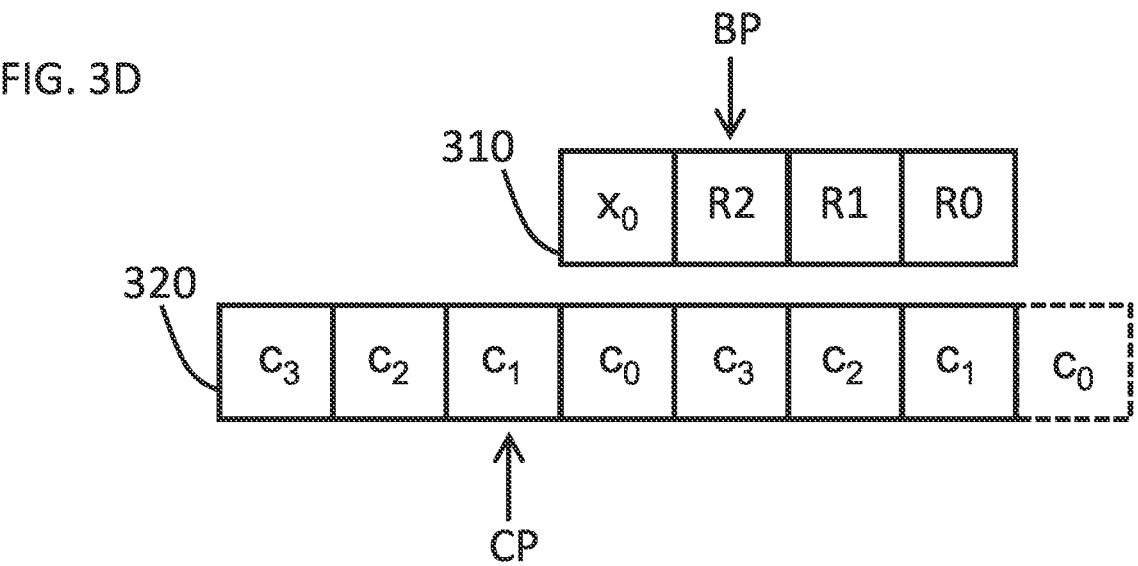

After generating a filter output, the buffer pointer BP and the coefficient pointer CP are updated, e.g., by the at least one processor. For example, as shown in FIG. 3D, the buffer pointer BP has been updated to point or indicate a next successive or succeeding element of the sample buffer 310. In this case, the next successive element is the position/element of the sample buffer 310 to the right of the previous position indicated by the buffer pointer BP. Hence the buffer pointer BP "moves" right and points to the second element from the left which in this case includes the value R2.

The coefficient pointer CP has also been updated or moved to a successive position. As shown, the coefficient pointer CP has been moved (in terms of left to right direction) from its previous position to a preceding successive position (moves left or opposite to traversal direction 340) and now indicates or points to the element or position of the coefficient array having the coefficient $c_1$ (third element from left). Thus, the CP pointer is updated to point to the coefficient that is to be multiplied by the first (left most) element of the sample buffer. In various examples, the coefficient pointer CP may move or advance to a previous element (from left to right perspective or in direction 340) to indicate a coefficient that is one order greater than the previous coefficient.

In general, when the coefficient pointer CP indicates a coefficient of order M ($c_M$), the update of the coefficient pointer CP moves the coefficient pointer CP to a position that has a coefficient of one order more ($c_{M+1}$) than previously. An exception is when the coefficient pointer is moving from the highest order coefficient ($c_{N-1}$), which in that case moves to the lowest order coefficient ($c_0$). The coefficient pointer CP can be moved or advanced consistently in one direction, one element or position at a time, except in the case where the coefficient pointer CP is at a boundary, start or end position/element of the coefficient array 320. In embodiments herein, an end position of an array or buffer can be a start or end of the array or buffer. Said differently, the end position can be start or last index position of the array or buffer.

After update of the buffer pointer BP, the next new input sample, $x_1$, can be obtained and stored in the sample buffer 310 at the position indicated by the buffer pointer BP.

Figure 3E:
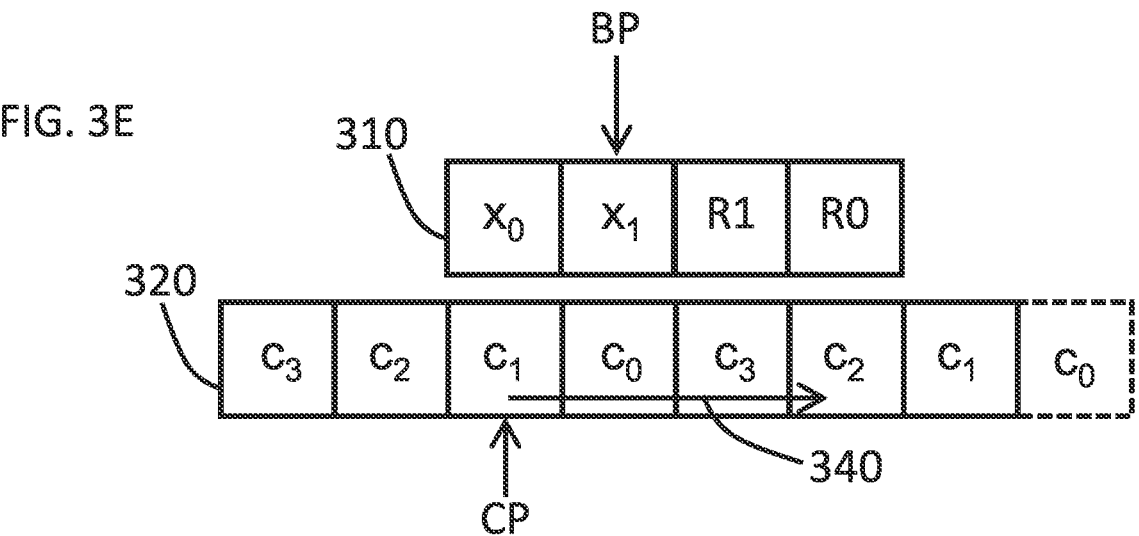

In FIG. 3E, after updates to the pointers and storing of the next sample $x_1$ in the sample buffer 310, the next filter output $y_1$ can be determined using the values in the sample buffer 310 and the subset of coefficients in the coefficient array 320. Again, the values in the sample buffer 310 are respectively multiplied with the subset of coefficients in the coefficient array 320 indicated by the coefficient pointer CP. Then the multiplicative products are summed up, added, or accumulated to determine the filter output $y_1$. That is, the filter output, $y_1$, is also determined using a MAC operation as the previous filter output $y_0$ in FIG. 3C. Accordingly, in this example, the filter output $y_1$ is thus given or defined by the equation 330 in FIG. 3E:

$$y_1 = x_0 * c_1 + x_1 * c_0 + R1 * c_3 + R0 * c_2$$

Again, a MAC unit can be used to generate the filter output $y_1$.

Figure 3F:
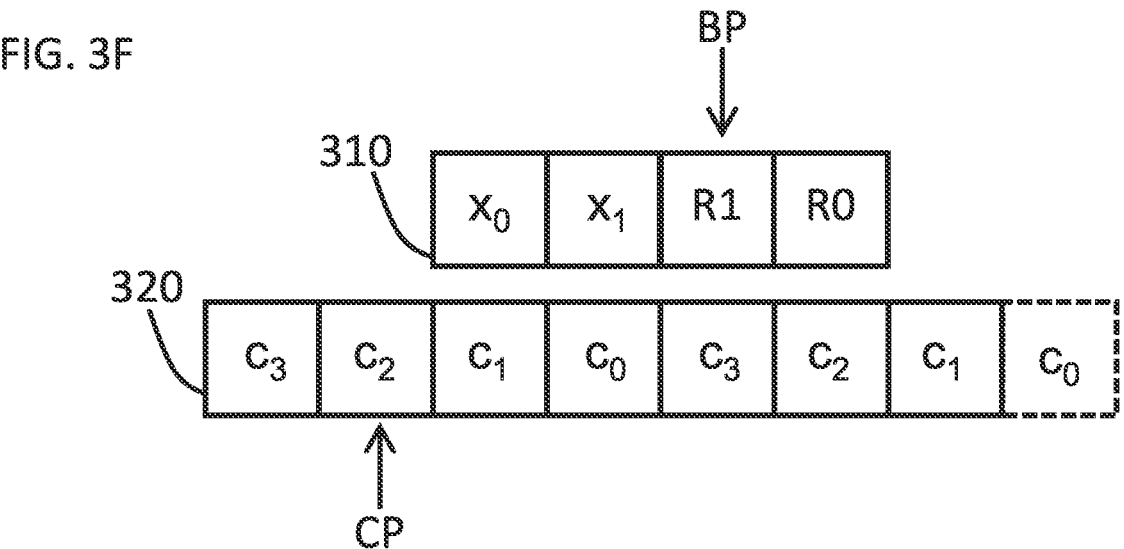

After determining the filter output $y_1$, the pointers BP and CP can then be updated as shown in FIG. 3F. Again, the buffer pointer BP can move or indicate a next successive position (e.g., next succeeding position) of the sample buffer 310 and the coefficient pointer CP can also be updated to a next successive position (e.g., a next preceding position) of the coefficient array 320.

Figure 3G:
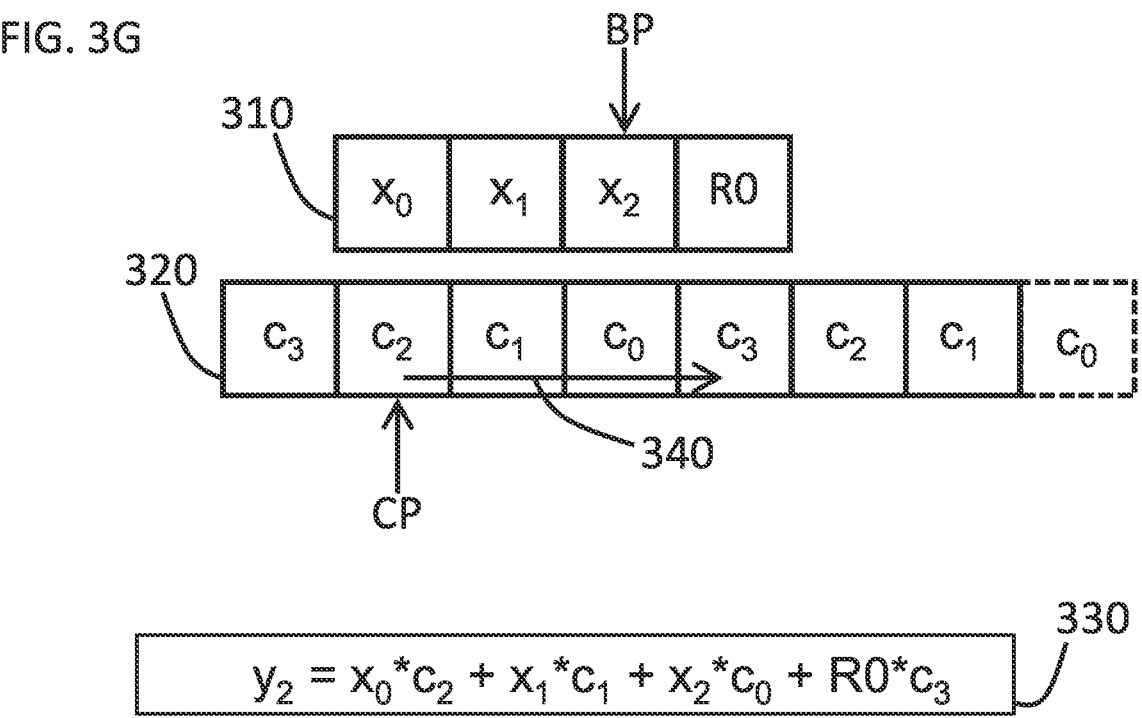

In FIG. 3G, the process repeats in a similar manner in that after updating the pointers BP and CP, in FIG. 3G, the next sample input $x_2$ is obtained and stored in the sample buffer 310 at the position currently indicated by the buffer pointer BP. Then the next filter output, $y_2$, is determined in a manner as described before in FIGS. 3C and 3E. That is a MAC operation can be performed and the filter output $y_2$ is determined by the following equation 330 in FIG. 3G:

$$y_2 = x_0 * c_2 + x_1 * c_1 + x_2 * c_0 + R0 * c_3$$

Figure 3H:
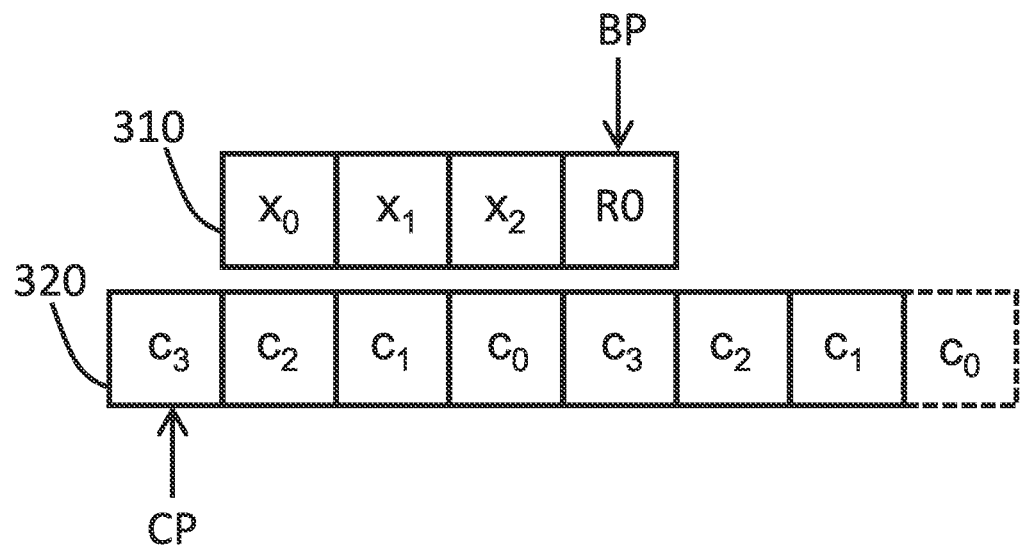

Again in FIG. 3H, the buffer pointer BP and the coefficient pointer are updated. The buffer pointer BP advances right and points to the next succeeding element, now the last or right most element. The coefficient pointer CP advances left to the next preceding element. Accordingly, the coefficient pointer CP again points to the position or element in the coefficient array 320 that is to be multiplied with a first or left most element of the sample buffer 310 which still holds the value $x_0$, the oldest stored input sample.

Figure 3I:
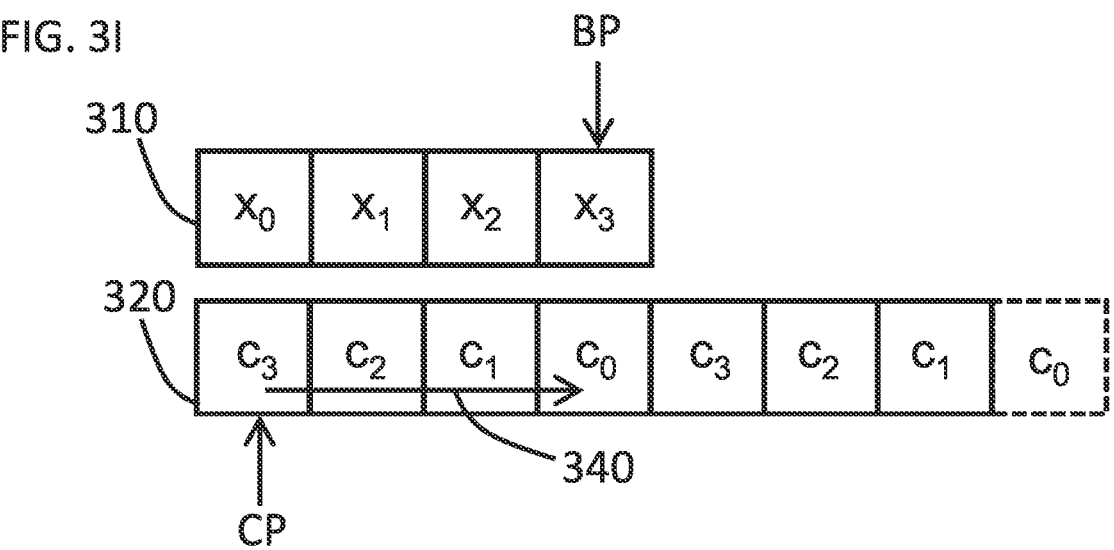

Again, in FIG. 3I, the sample buffer 310 has been updated to store the next obtained input sample $x_3$. After storing the input sample $x_3$, the filter output $y_3$ can be determined as described previously, e.g., by a MAC operation using the values in the sample buffer 310 and the corresponding subset of coefficients in the coefficient array 320. The filter output $y_3$ in FIG. 3I is, hence, given by the equation 330:

$$y_3 = x_0 * c_3 + x_1 * c_2 + x_2 * c_1 + X_3 c_0$$

After determining the filter output $y_3$, the buffer pointer BP and the coefficient pointer CP are updated and moved. However, as shown in FIGS. 3H and 3I, before they are moved, both the buffer pointer BP and coefficient pointer CP are at or indicate the end positions, end elements or boundaries respectively of the sample buffer 310 and the coefficient array 320.

Figure 3J:
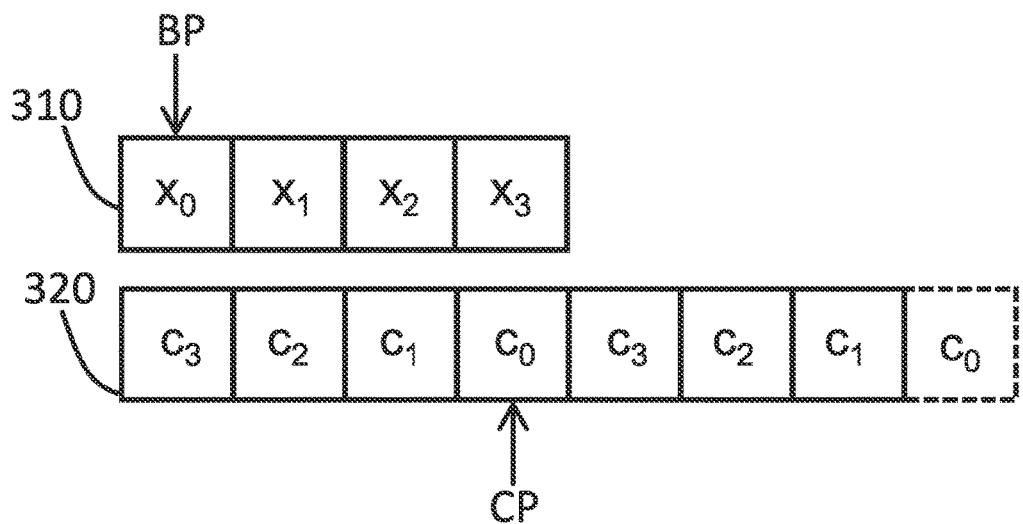

Since the sample buffer 310 is a circular buffer, the advancement of the buffer pointer BP to the next successive position of the sample buffer 310 to the right end position or boundary brings the buffer pointer BP to the first or left most position/element of the sample buffer 310. This is shown in FIG. 3J. In general, for exemplary embodiments described herein, buffer pointers BP are able to always advance to a next position in the sample buffer because the sample buffer is a circular buffer and thus the end positions or boundaries of the sample buffer are therefore linked or logically connected.

For the coefficient pointer CP, the coefficient array 320 is not a circular buffer and thus there is no next preceding successive position from the left end position or element of the coefficient array 320. When the coefficient pointer CP reaches the end (left most) of the coefficient array 320, the coefficient pointer CP advances to a predefined position. In the example of FIG. 3J, this predefined or predetermined position can be the position of the coefficient array 320 having first instance (from left to right) of the lowest order coefficient, $c_0$ because the coefficient pointer CP previously pointed to the coefficient $c_3$, the highest order coefficient of the 4-tap digital filter.

Figure 3K:
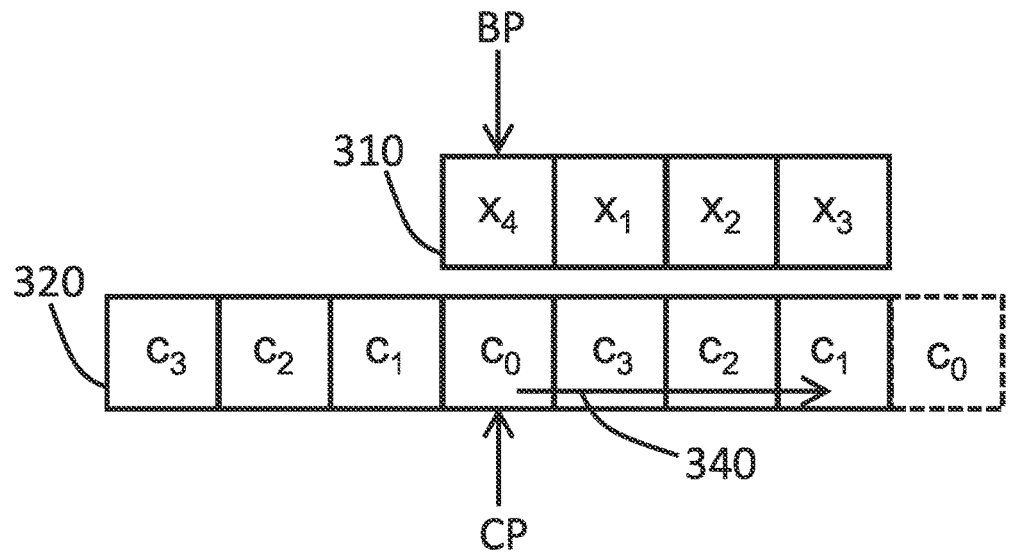

After the buffer pointer BP has been updated, at FIG. 3K, the next or newest input sample $x_4$ can be stored in the sample buffer 310 according to the position indicated by the buffer pointer BP. In this case, the new sample $x_4$ replaces the previous oldest sample $x_0$ in the sample buffer.

Again after pointer updates and storing the sample $x_4$, the filter output $y_4$ is determined using the samples in the sample buffer 310 and the subset of coefficients in the coefficient array 320 (again indicated by the coefficient pointer CP). Another MAC operation is performed using the samples in the sample buffer 310 and the subset of coefficients of the coefficient array 320. The filter output $y_4$ in FIG. 3K is given by the equation:

$$y_4 = x_4 * c_0 + x_1 * c_3 + x_2 * c_2 + X_3 c_1$$

Figure 3L:
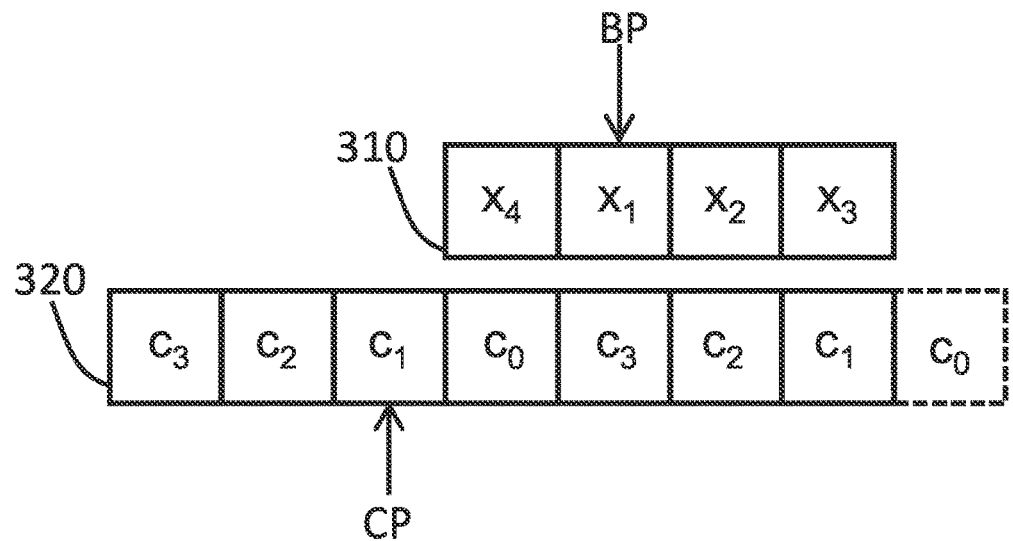
Figure 3M:
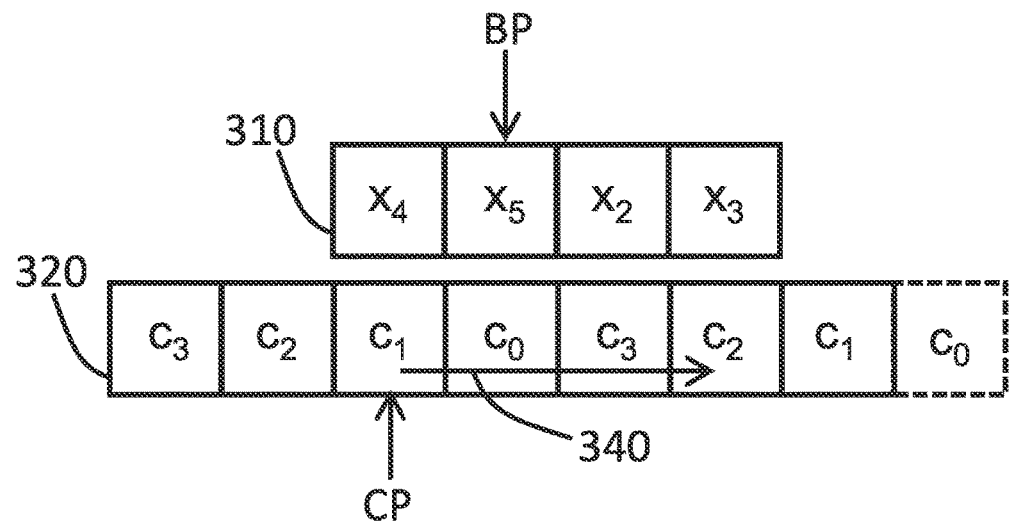

The process indicated from FIGS. 3A-3K can continue, indefinitely, until a reset or initialization is implemented. For example, FIG. 3L shows the next advancement of the pointers BP and CP, and FIG. 3M shows the next filter output $y_5$ from the next input sample $x_5$.

If a reset is implemented, the sample buffer 310 can return to the state having the reset values as indicated by FIG. 3A, or other values. Moreover, the buffer pointer BP and the coefficient pointer CP can return and indicate or point respectively to the positions of the sample buffer 310 and coefficient array 320 shown in FIG. 3B.

The sample buffer 310 and the coefficient array 320 described or depicted in FIGS. 3A-3M are merely one example of how samples/values and coefficients may be arranged or stored. For example, input samples may be stored in an opposite way, order, or direction, e.g., from right to left (opposite to direction of 340) with the right most element being the "first" element. Further, coefficients of the coefficient array can also be arranged or stored differently, such as in the reverse order to the arrangement shown in FIGS. 3A-3M.

In addition, as previously explained, the coefficient array 320 does not require the last or right most coefficient, $c_0$, to implement the digital filter. That is, the last element or last position of the coefficient array need not be used or realized. The coefficient array requires only 2N-1 elements, where N is the number or taps of the digital filter to be implemented.

Figure 4A:
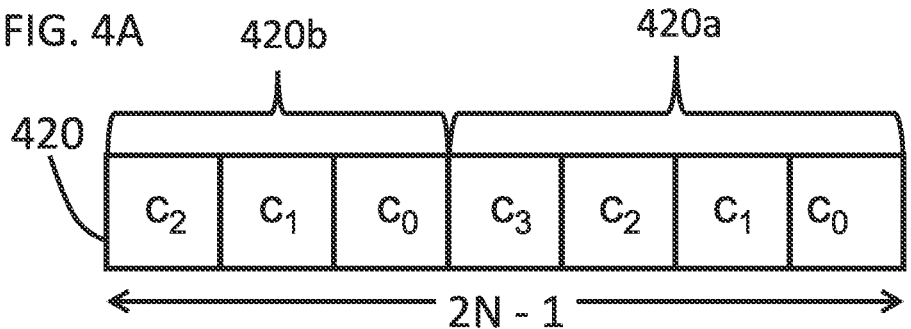
FIGS. 4A-4D depict a process for implementing a digital filter according to at least one exemplary embodiment of the present disclosure.

In other examples other coefficients may be exclude or omitted from a coefficient array. Referring back to the coefficient array 320 of FIG. 3A, instead of leaving out the right most element and the coefficient $c_0$, instead the left most element or and left most coefficient $c_0$, can instead be omitted from the coefficient array. An example of this is the coefficient array 420 of FIG. 4A. As shown, the coefficient array 420 has a length of 7 (or length 2N-1, where N is 4) and the coefficient at the left most position or element of the coefficient array 420 is $c_2$, and the right most coefficient is $c_0$. Accordingly, the reference numerals 420a and 420b refer to similar elements as reference numerals 320a and 320b of FIG. 3A.

Figure 4B:
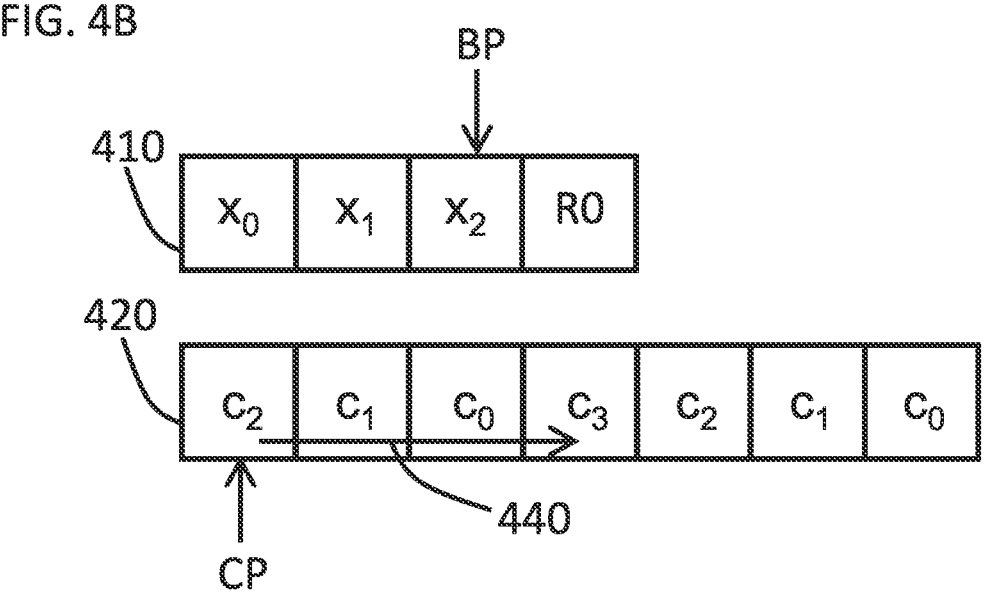
Figure 4C:
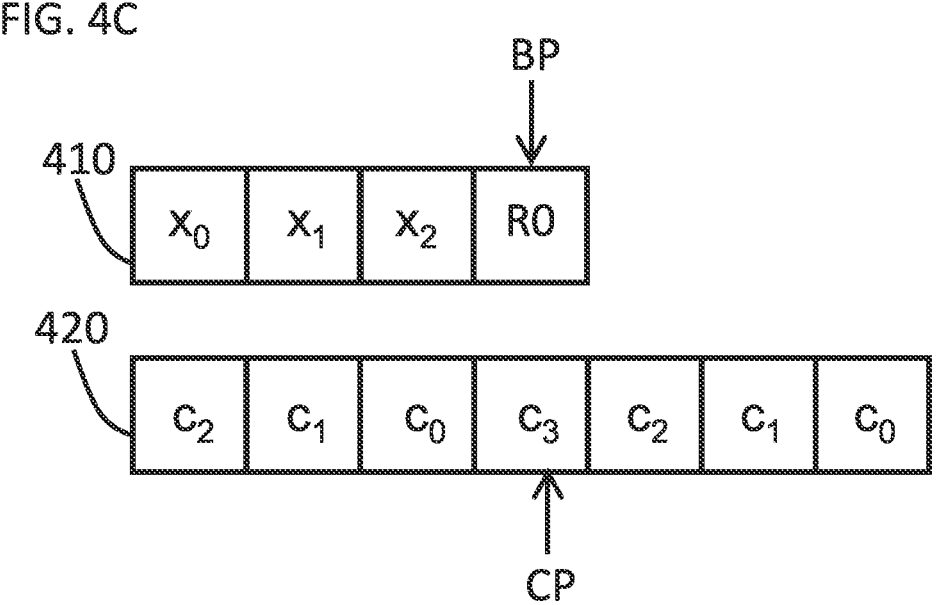

In FIGS. 4A-4D, the coefficient array 420 can be used to implement a digital filter or process 400, e.g., similar to the process 300 described in FIGS. 3A-3M. For example, FIG. 4B shows an implementation at the same place as FIG. 3G, where after reset, two filter outputs have been calculated. In this case, the sample buffer 410 can be implemented the same as the sample buffer 310. In FIG. 4B, a third sample input $x_2$ has been obtained stored at the position indicated by the buffer pointer BP. The position of the buffer pointer BP in FIG. 4B is the same as the position of the buffer pointer BP in FIG. 3G. The coefficient pointer CP of FIG. 4B and the coefficient pointer CP of FIG. 3G each points to or indicates a position having the same coefficient ($c_2$). However, the position of coefficient pointer CP of FIG. 4B is one element or one position before or to the left of the position indicated by the coefficient pointer CP of FIG. 3G. The coefficient pointer CP of FIG. 4B is at or indicates the first position or left most element of the sample buffer 410, while the coefficient pointer CP of FIG. 3G is at or indicates the second position or second from the left position of the sample buffer 310.

The filter process at FIG. 4B proceeds as previously described as a MAC operation is implemented to produce the filter output $y_2$, which uses the same subset of coefficients as the MAC operation implemented in FIG. 3G. Accordingly, the equation 430 for the output $y_2$ in FIG. 4B is the same as the equation 330 in FIG. 3G.

Figure 4D:
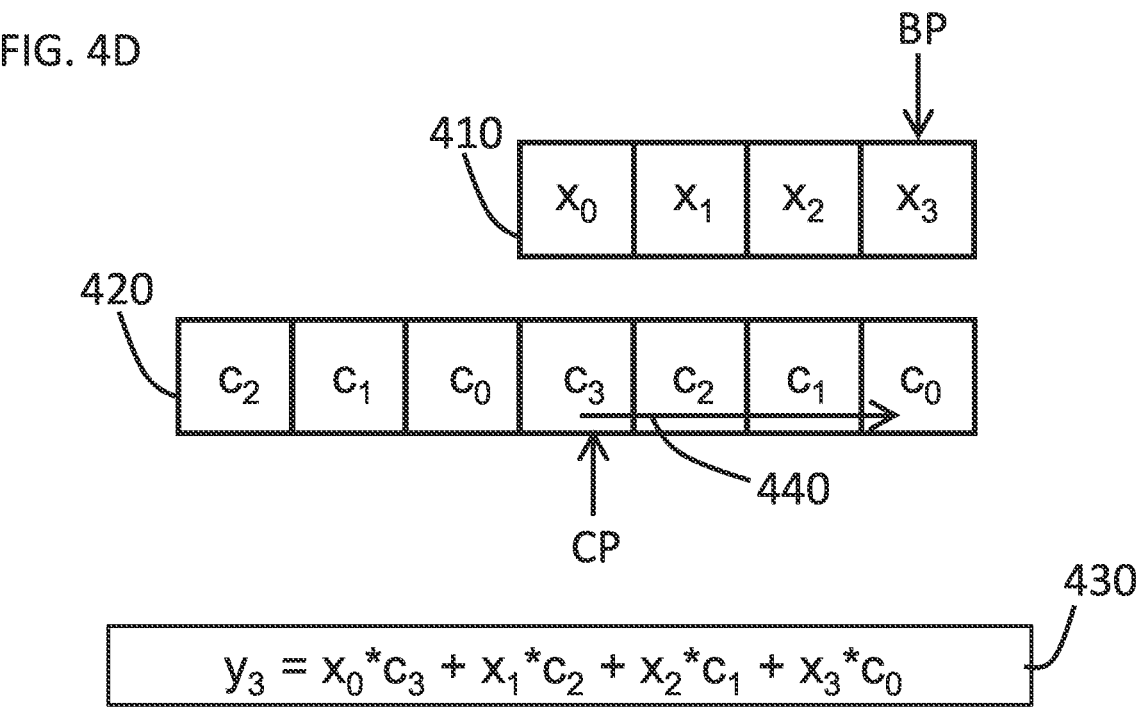

After determining the filter output $y_2$, the pointers BP and CP are updated or moved in FIG. 4D. In this case, since the coefficient pointer CP is at the left most or start of the coefficient array 420, it cannot be moved to a preceding element of coefficient array 420. Instead, the coefficient array 420 is set or advanced to the position having the coefficient $c_3$ which is the coefficient having a coefficient order one greater than coefficient ($c_2$) at the previously position of the coefficient pointer CP. Accordingly, the coefficient pointer CP now indicates the fourth position or fourth from the left or start of the coefficient array 420. Again, the filter output $y_3$ can determined (e.g., with a MAC operation). As seen the equation 430 indicating the filter output $y_3$ is the same as the equation 330 of FIG. 3I.

As noted, the approach or processes described in FIGS. 3A-3M or in FIGS. 4A-4D, the traversal direction, or the direction in which samples/values of the sample buffer and coefficients of the coefficient array are aligned (see arrows 340 and 440) depends on the arrangement of the samples and the coefficients in the sample buffer and coefficient buffer. In other instances, the samples and coefficients may be arranged in opposite or reverse order/direction to the arrangements shown in FIGS. 3A-4D, and the traversal direction may be flipped or reversed as well. The updating or movement of the buffer pointer and coefficient pointer can also be opposite or reverse in such cases.

FIG. 5 includes exemplary sample code that when executed, can implements a digital filtering process similar to the one described in connection with FIGS. 3A-3M. In the example of FIG. 5, the sample code, when executed, can implement an 8-tap digital FIR filter.

FIG. 6 includes exemplary sample code 600 that implements a process similar to the one described in connection with FIGS. 4A-4D. In the example of FIG. 6, the sample code, when executed, implements an 8-tap digital FIR filter.

Figure 7:
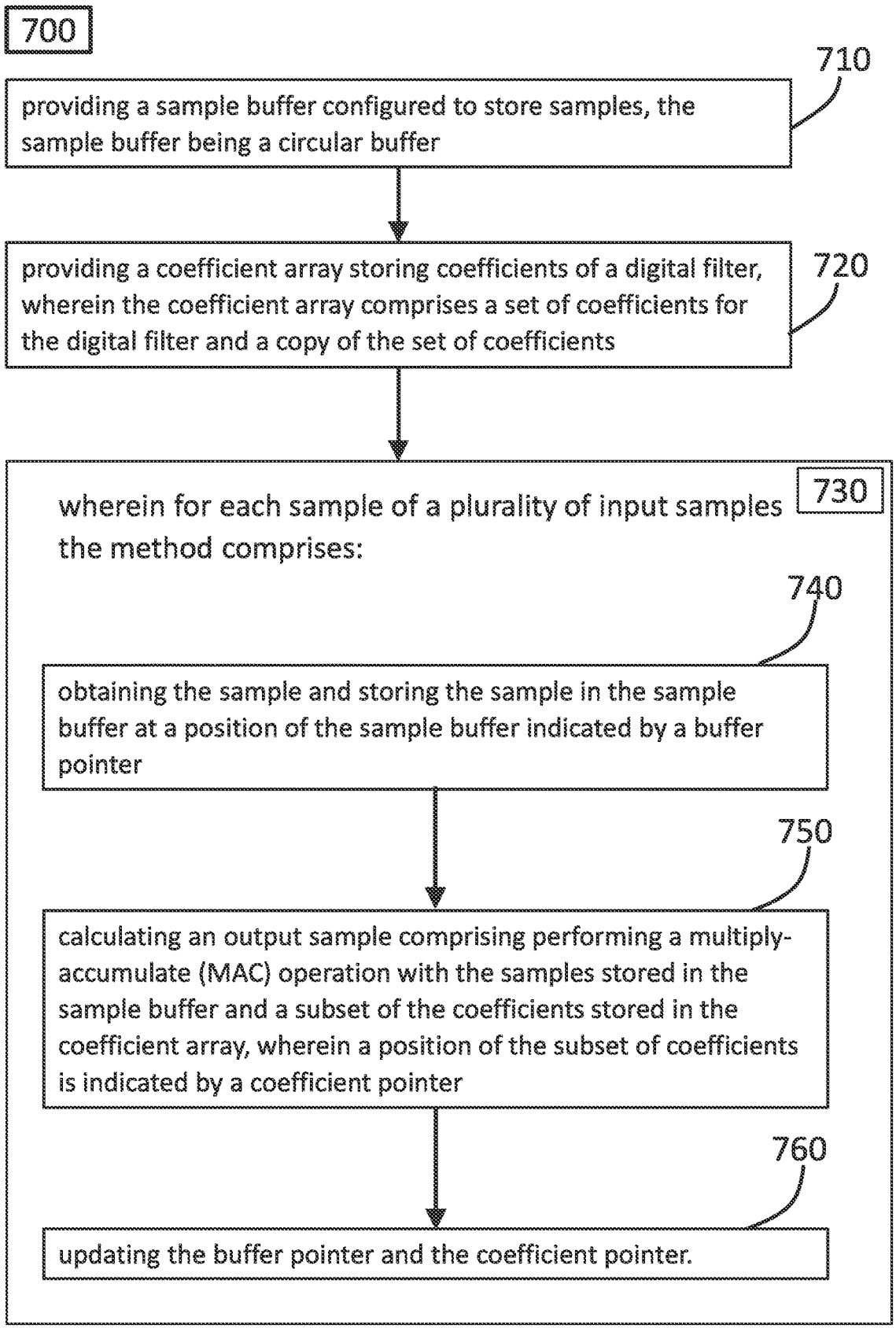
FIG. 7 shows an exemplary method for digital filtering sample according to at least one exemplary embodiment of the present disclosure.

FIG. 7 shows an exemplary method 700 for digital filtering sample according to at least one exemplary embodiment of the present disclosure. The method 700 includes at 710 providing a sample buffer configured to store samples, the sample buffer being a circular buffer. At 720 the method further includes providing a coefficient array storing coefficients of a digital filter, wherein the coefficient array comprises a set of coefficients for the digital filter and a copy of the set of coefficients. Further, at 730, wherein for each sample of a plurality of input samples the method further includes:
- at 740, obtaining the sample and storing the sample in the sample buffer at a position of the sample buffer indicated by a buffer pointer;
- at 750, calculating an output sample comprising performing a multiply-accumulate (MAC) operation with the samples stored in the sample buffer and a subset of the coefficients stored in the coefficient array, wherein a position of the subset of coefficients is indicated by a coefficient pointer; and
- at 760, updating the buffer pointer and the coefficient pointer.

In one or more exemplary embodiments of the present disclosure, the processes or methods herein can be implemented on a sample-by-sample basis. That is, the determination of a filter output may be triggered by the arrival of an incoming input sample. For example, the one or more processors (e.g., DSP) that implement any of the methods or variants thereof, may lie dormant and then may wake-up in response to arrival of a new sample. Then the sample inputs may stream or may be provided on a consistent basis or at steady rate. In various examples, the rate of input samples arriving in the filter may not be dependent on whether the one or more processors implementing the filter or filtering described herein goes to sleep or not.

Further, in some cases, the one or more processors implementing the digital filter may sleep until a new sample(s) arrive, the arrival of which triggers the one or more processors to wake-up.

In one or more exemplary embodiments of the present disclosure, Single-Instruction-Multiple-Data (SIMD) instructions may be used to implement the processes or methods described. For example, DSPs executing an arbitrary instruction SIMD implement the following for 2 coefficients ($c_i$, $c_{i+1}$) saved in C and 2 input samples ($x_n$, $x_{n+1}$) saved in B:
a. SIMD A,B,C is equivalent with the 2-fold MAC operation:

$$A = A + x_n * c_i + x_{n+1} * C_{i+1}.$$

Therefore, the use of SIMD instructions may be used in various embodiments of the present disclosure (e.g., process 300, 400, etc.) to fetch multiple coefficients and multiple samples or values for computation of one output sample y[n].

Figure 8:
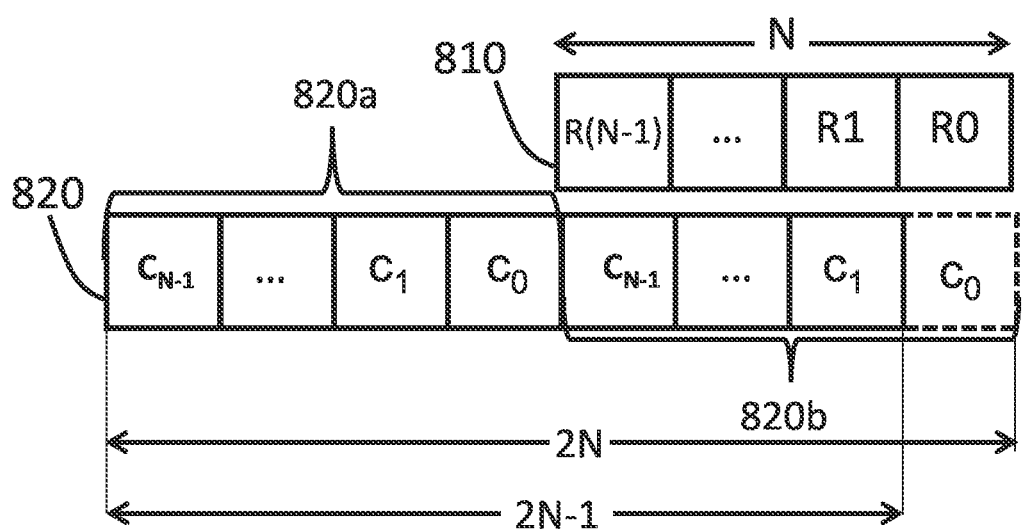
FIG. 8 depicts an exemplary sample buffer and coefficient buffer used for digital filtering according to at least one exemplary embodiment of the present disclosure.

In the context of FIGS. 3A-3M and FIGS. 4A-4D, examples where given of a digital filtering processes for an N-tap filter, where N=4. However, these processes or variants may be implemented for an arbitrary size N and not limited to N=4. In such case, FIG. 8 shows an example of a corresponding sample buffer 810 and coefficient array 820 for an arbitrary size N. 820a indicates the set of coefficients and 820b indicates a copy of the set of coefficients.

Figure 9A:
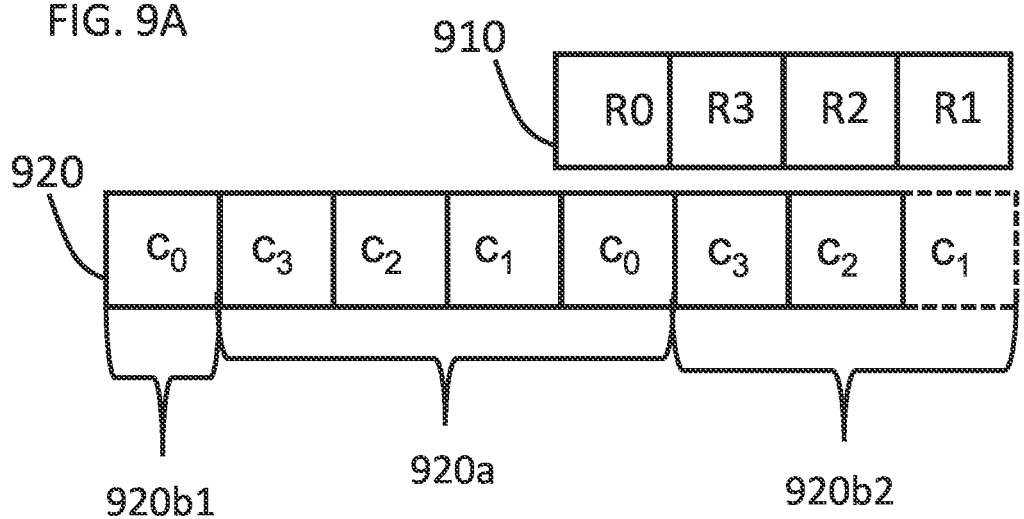
FIGS. 9A-9K depict a process for implementing a digital filter according to at least one exemplary embodiment of the present disclosure.

FIGS. 9A-9K show another process 900 to implement a digital filter according to another exemplary embodiment of the present disclosure. The process 900 may be implemented in a similar manner to the process 300 described in FIGS. 3A-3M. Like in FIG. 3A, the exemplary process 900 is for a 4-tap digital filter (N=4). However, as shown in FIG. 9A, the coefficient array 920 is implemented differently. As shown, the set of coefficients 920a is stored together or sequentially as in other examples, but the coefficients of the copy of the set of coefficients is not stored together. In this example, the copy of coefficients includes a first part 920b1 and a second part 920b2. The last coefficient, $c_1$, is optional for the coefficient array 920 and may be omitted from the second part 920b2 of the copy of coefficients.

Further, the sample buffer 910 also includes reset values, e.g., after initialization or rest. However, the reset values in this case can be implemented differently. That is, the "oldest" reset value R3, is now not stored at an end or start of the sample buffer 910.

Figure 9B:
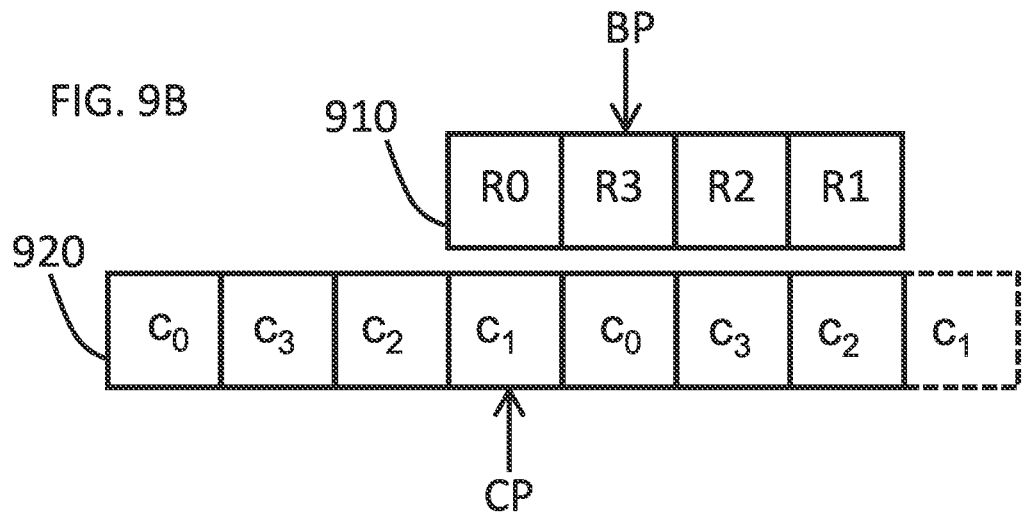

FIG. 9B shows the buffer pointer BP and the coefficient pointer CP at predefined initial or reset positions. The buffer pointer BP of FIG. 9B starts or initializes at a second position or second index position from the left in the sample buffer 910. In contrast, the buffer pointer BP of FIG. 3B starts or initializes at the first or left most end position of the sampler buffer 310. That is, the buffer pointer BP of FIG. 9B, no longer needs to reset or initialize at an end position or boundary of the sampler buffer 910.

While the coefficient pointer CP of FIG. 9B also has the same starting or initialized position compared to the coefficient pointer CP of FIG. 3B. Here in FIG. 9B the coefficient pointer CP indicates the coefficient ci instead of the coefficient $c_0$ as is the case in FIG. 3B.

Nevertheless, the process of determining the output samples in process 900 is similar to the process 300. As in the process 300 and 400, the buffer pointer BP in FIGS. 9A-9K similarly is updated to advance to the right (same as traversal direction 940) so as to point or indicate the oldest value in the sample buffer 910. Further, like the of processes 300 and 400, the calculation of the output samples y[n] is also done in a similar manner. As shown in in FIG. 9C, the filter output is indicated by the equation 930:

$$y_0 = R0 * c_1 + x_0 * c_0 + R2 * c_3 + R1 * c_2$$

or $$y_0 = x0 * c_0 + R2 * c_3 + R12 * c_2 + R0 * c_1$$

Figure 9C:
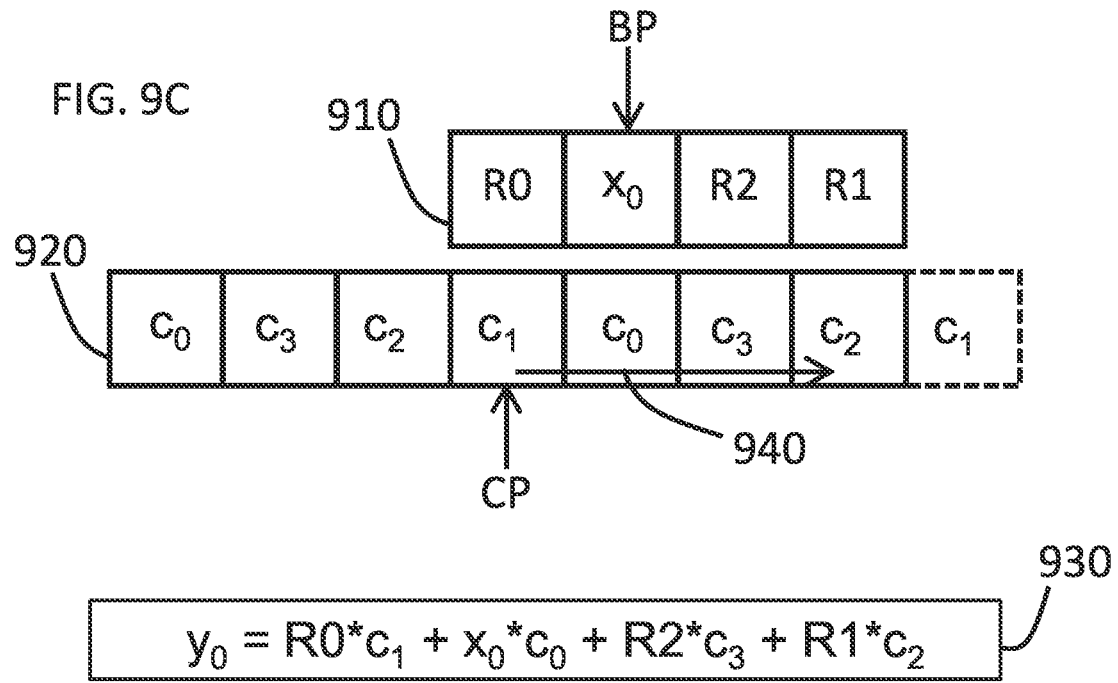
Figure 9D:
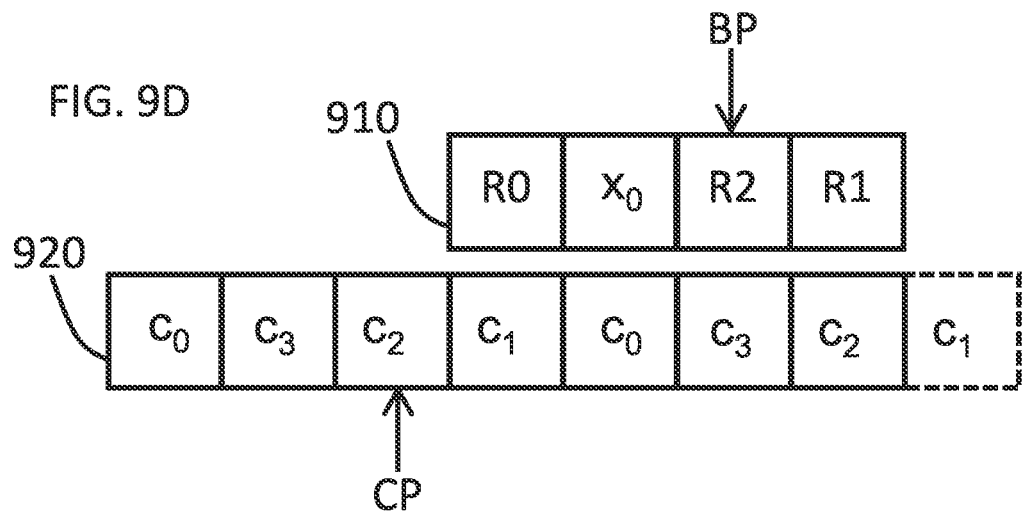
Figure 9E:
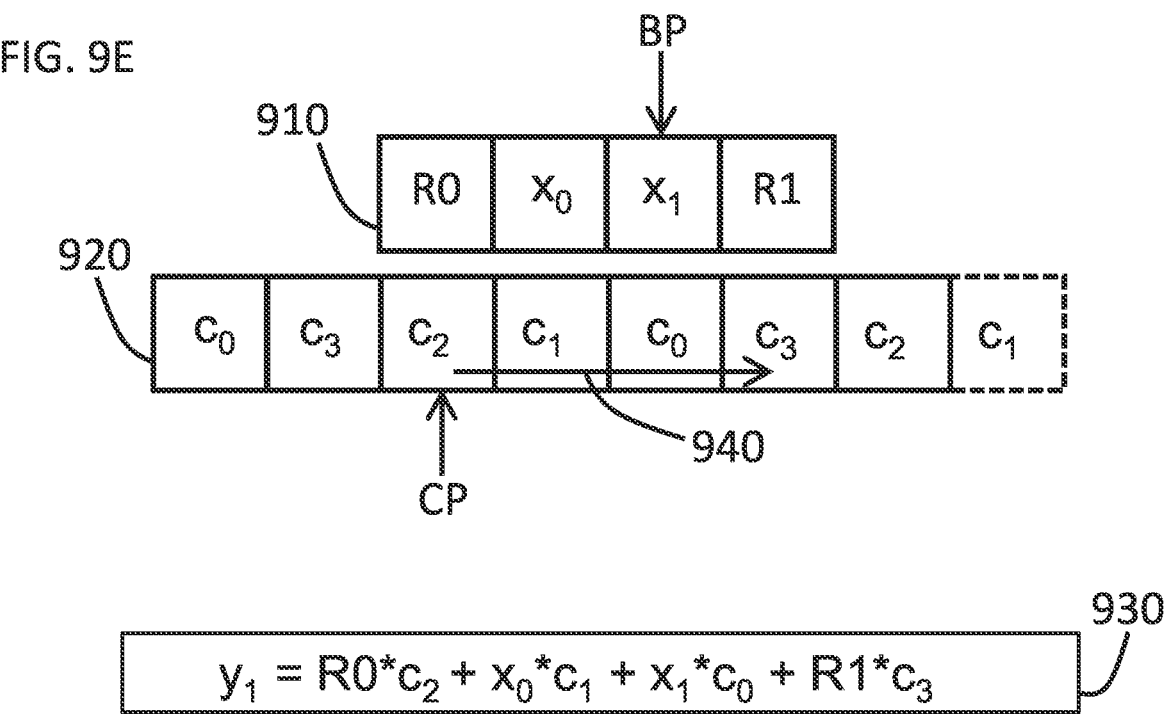
Figure 9F:
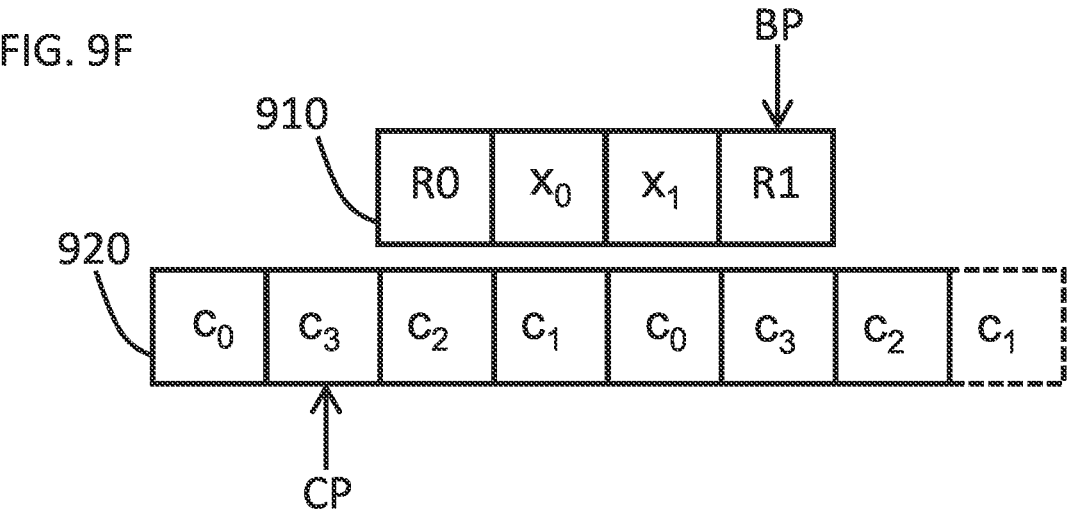
Figure 9G:
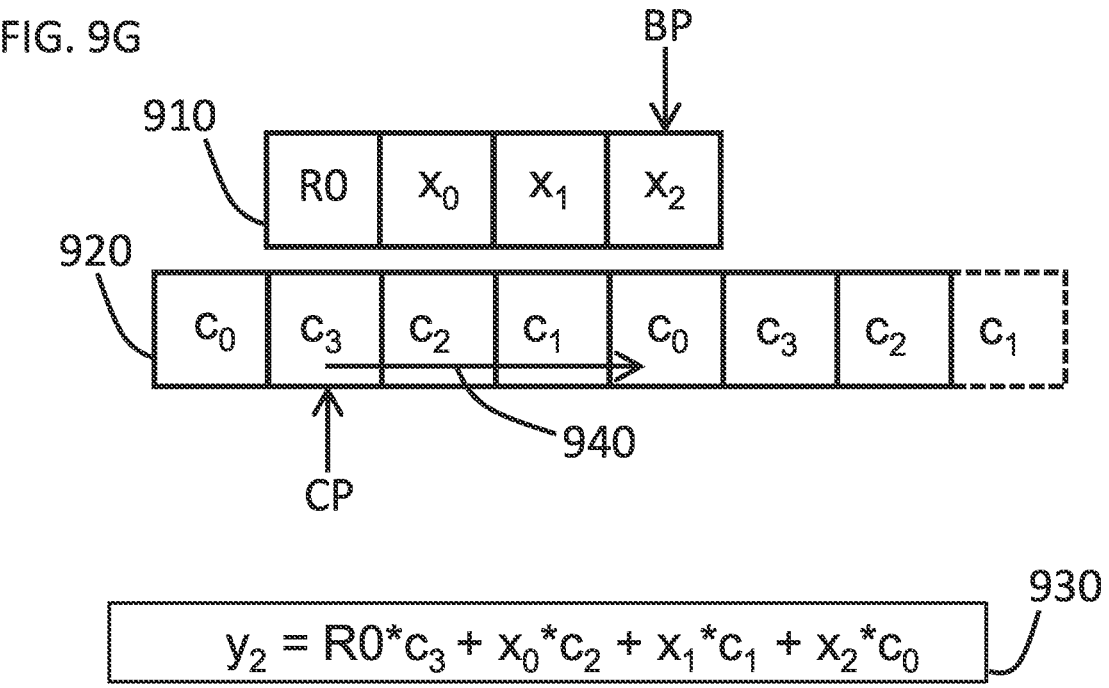
Figure 9H:
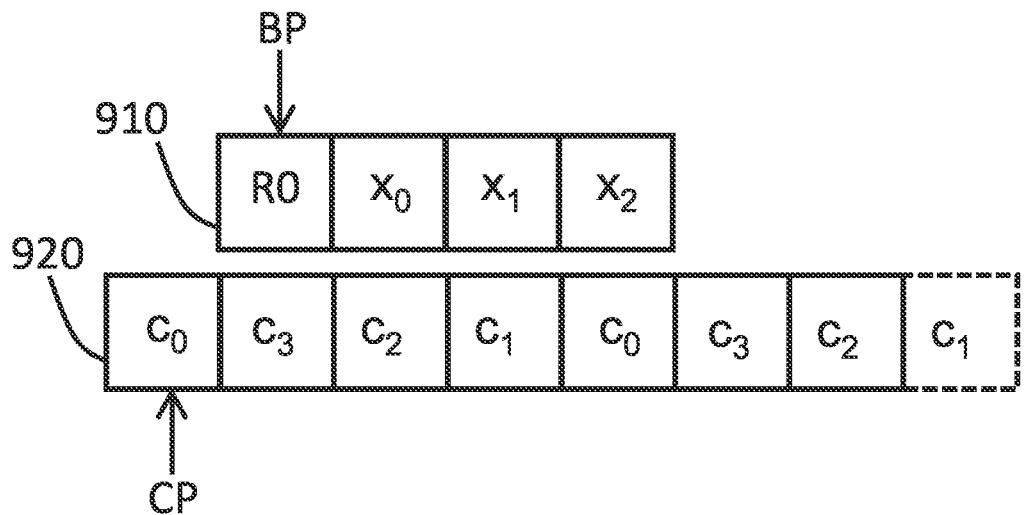
Figure 9I:
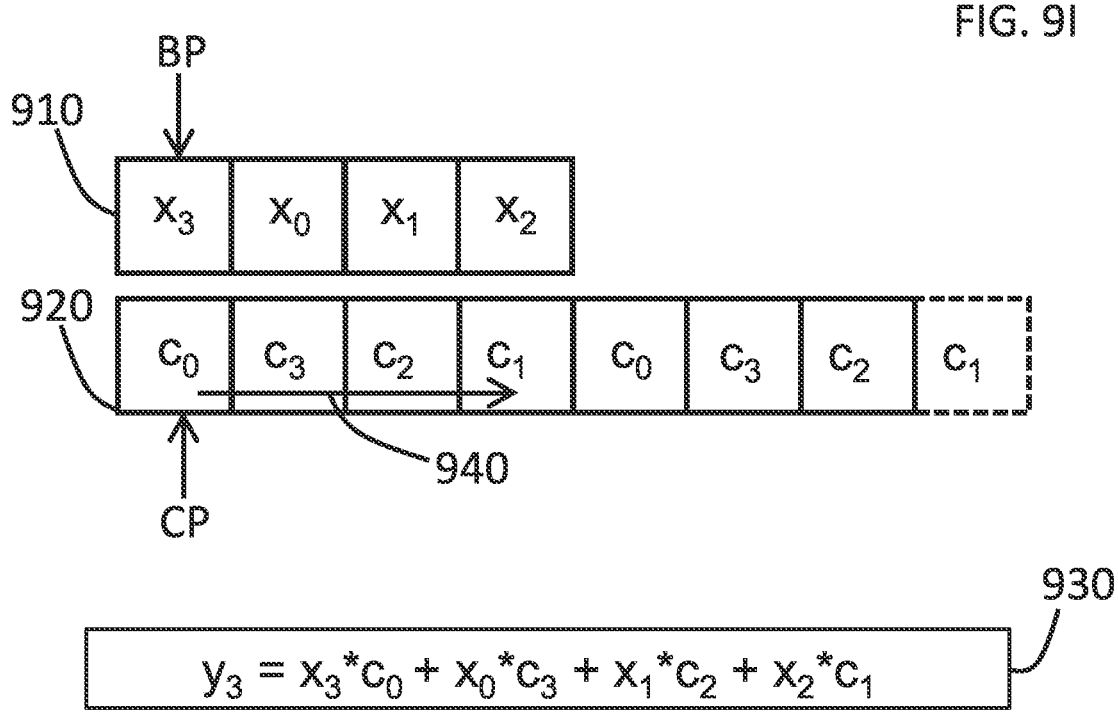

As in other exemplary embodiments of the present disclosure, the determination of the filter output $y_0$ can include multiplying current values of the sample buffer 910 with corresponding coefficients of the coefficient array 920. The corresponding coefficients are a subset of the coefficients stored in the coefficient array, e.g., including one of each of the coefficients ($c_0$-$c_3$). The coefficient pointer CP indicates the corresponding coefficients or subset, e.g., by indicating a beginning or end of the subset of corresponding coefficients. The coefficients to be used for the multiplication again, the corresponding subset of coefficients, are located sequentially or in consecutive positions in the coefficient array 920. Indeed, the equation 930 for FIG. 9C is the same as the equation 330 for FIG. 3C. That is, the same equation is used to determine the output $y_0$ in both FIG. 3C and FIG. 9C.

As in other cases, the multiplication operation includes multiplying the sample or value of first element (left most element) of the sample buffer 910 and the coefficient in coefficient array 920 located at the position indicated by the coefficient pointer CP. Therefore, R0, which is stored in the first or left most element of the sample buffer 910, can be fetched and multiplied with the coefficient $c_1$, fetched from the position of the coefficient array 920 indicated by the coefficient pointer CP.

The other values or samples of the coefficient array 920 can be multiplied in a similar manner. Again, the multiplication operation progresses as the remaining values of the sample buffer 910 and their corresponding coefficients in the coefficient array 920 are multiplied. The value $x_0$, stored in the second or second left most element in the sample buffer 910, is the next succeeding or successive element to first element of the sample buffer 910. Thus $x_0$ can be fetched and multiplied with the coefficient $c_0$, which is fetched from the next successive or succeeding position away from the position in the coefficient array 920 indicated by the coefficient pointer CP.

Further, the reset value R2, located at a next successive position/element, the third element from the left of the sample buffer 910, is fetched and is multiplied with the coefficient $c_3$ which is fetched from at next successive or succeeding position away from the coefficient pointer CP. Finally, in this example, the value, R1 stored at the next successive or succeeding element, the fourth or last element of the sample buffer 910, is fetched and is multiplied with the coefficient $c_2$ which is fetched from at next successive or succeeding position away from the position indicated by the coefficient pointer CP.

Again, for purposes of explanation, in FIG. 9C the sample buffer 910 has been horizontally aligned to with the subset of coefficients in the coefficient array 920 to show the correspondence for the MAC operations. As indicated by the arrow 940, the multiplication process traverses or occurs in a single direction with respect to the sample buffer 910 and the coefficient array 920.

As can be seen in FIGS. 9D-9K, the process 900 continues as in other examples described herein with the buffer pointer BP and coefficient pointer CP advancing after a MAC operation and the obtained samples being stored in the position of the sample buffer 910 indicated by the buffer pointer BP. Further, the MAC operations and equations 930 for outputs $y_1$, $y_2$, $y_3$, etc. can be identical to the equations 330 for outputs $y_1$, $y_2$, $y_3$, etc.

Figure 9J:
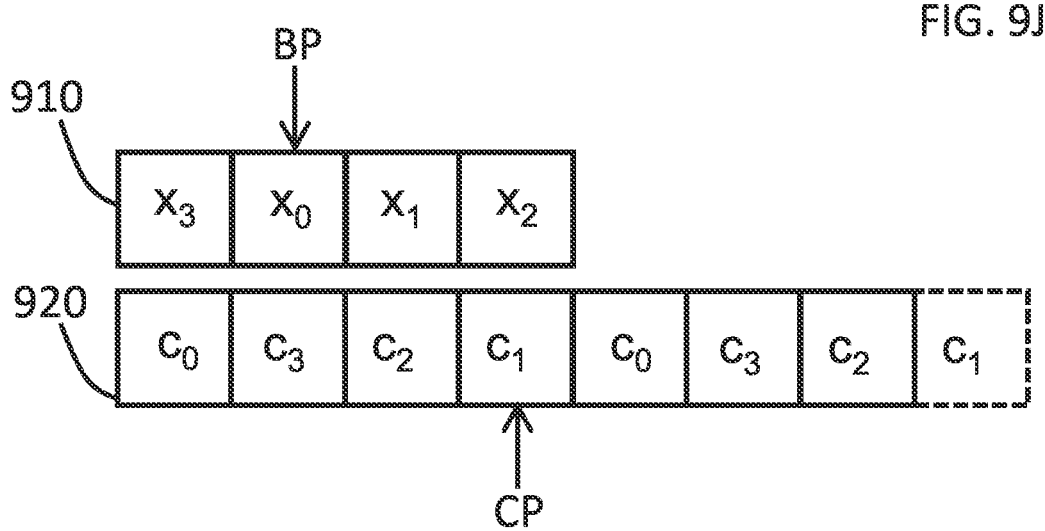
Figure 9K:
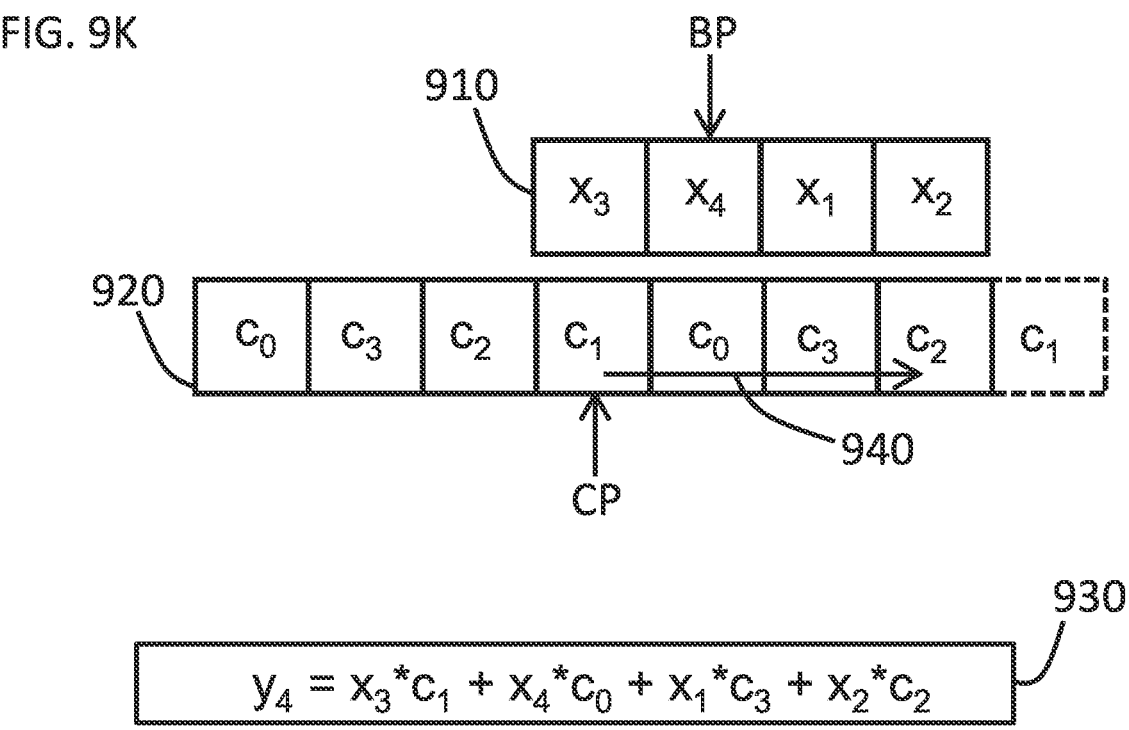

At FIG. 9J, the coefficient pointer CP has been reset to an initial position. Previously, the coefficient pointer CP had advanced leftward to the first position of the coefficient array 920. In the update in FIG. 9K, the coefficient pointer resets to fourth position of the coefficient array to again indicate the coefficient $c_1$. Similarly, the buffer pointer BP also has returned to its initial position, which hold the oldest value, $x_0$. Like in other cases, the buffer pointer BP moves or advances (rightward or in traversal direction 940) according to the dictates or principles of the sample buffer 910, which is a circular buffer, which the boundaries or end portions (first and last positions) being connected. As shown in FIG. 9K, again the value $x_0$, the oldest value, becomes replaced with the newest sample, $x_4$.

The process 900 can continue with new sample or can be reset, e.g., back to the state shown in FIG. 9A.

While the process 900 is shown for the case of N=4, like the other processes, (300, 400, etc.) the value of N can include other values. Further, other variants of the process 900 can be implemented. As described with respect to other exemplary embodiment of the present disclosure, the process 900 can be implemented in reverse, that is coefficients of the coefficient array 920 and values of the sample buffer 910 stored in reverse order and the movement of the buffer pointer BP, the coefficient pointer CP, and the traversal direction 940 of the MAC operations also being implemented reversed to what is shown in FIGS. 9A-9K.

The various exemplary embodiments disclosed herein for implementing a digital filter require less instructions in order to process a single input sample. Furthermore, some embodiments produce time-equidistant filter output or output samples, which can be of benefit for systems dealing with strict timing requirements. For one example, the processes, devices, or methods described herein can be used in decomposition filters like poly-phase filters that split up the filter function in sub-filters. These sub-filters again can be implemented with the filtering processes, methods or devices described herein. Further, while the use of some of the processes have been described using a MAC unit or DSP, such components are not necessary to carry out the exemplary embodiments described herein, as other processors, devices, or components may be used to carry out the method.

The following examples pertain to further aspects of this disclosure:

Example 1 is a method for filtering a plurality of discrete samples, including: providing a sample buffer configured to store samples, the sample buffer being a circular buffer; providing a coefficient array storing coefficients of a digital filter, wherein the coefficient array includes a set of coefficients for the digital filter and a copy of the set of coefficients; wherein for each sample of a plurality of input samples the method includes:

a. obtaining the sample and storing the sample as a value in the sample buffer at a position of the sample buffer indicated by a buffer pointer; calculating an output sample comprising performing a multiply-accumulate (MAC) operation with values currently stored in the sample buffer and a subset of the coefficients stored in the coefficient array, wherein a position of the subset of coefficients in the coefficient array is indicated by a coefficient pointer; and updating the buffer pointer and the coefficient pointer.

Example 2 is the subject matter of Example 1, wherein the buffer pointer can indicate a position in the sample buffer including an oldest value of the sample buffer.

Example 3 is the subject matter of Example 1 or 2, wherein performing the MAC operation may further include: multiplying the values of the sample buffer respectively with the subset of coefficients to produce a plurality of multiplicative products, summing the multiplicative products together to produce a filter output.

Example 4 is the subject matter of Example. 3, wherein multiplying the values of the sample buffer respectively with the subset of coefficients may include, for a plurality of iterations: fetching one of the values from the sample buffer, fetching the corresponding coefficient for the fetched sample, and multiplying the fetched sample with the fetched coefficient.

Example 5 is the subject matter of Example 4, wherein for the plurality of iterations, an initially fetched value can be the value located at an end position of the sample buffer and each value fetched after the initially fetched sample can be located one position further away in the sample buffer from the initially fetched value in the sample buffer, and an initially fetched coefficient can be the coefficient located at a position of the coefficient array indicated by the coefficient pointer, and wherein each sample after the initially fetched coefficient is located one position further away from the initially fetched coefficient in the coefficient array.

Example 6 is the subject matter of any of Examples 1 to 5, wherein updating the buffer pointer can include updating the buffer pointer to indicate a position in the sample buffer that is one position further away from the previous position indicated by the buffer pointer, wherein each update of the buffer pointer advances the position indicated by the buffer pointer in a first direction.

Example 7 is the subject matter of any of Examples 1 to 6, wherein updating the coefficient pointer can include: updating the coefficient pointer to indicate a position in the coefficient array that is one position further away from the previous position indicated by the coefficient pointer when the previous position is not at an end position or boundary of the coefficient array and wherein the updating occurs in a second direction, and updating the coefficient pointer to a predefined position when the previous position is at an end position of the coefficient array.

Example 8 is the subject matter of Example 7, wherein the second direction can be a direction opposite to the first direction.

Example 9 is the subject matter of any of Examples 1 to 6, wherein the copy of the set of coefficients can include all or less than all of the set of coefficients.

Example 10 is the subject matter of Example 1, wherein performing a multiply-accumulate (MAC) operation can include performing the MAC operation with a MAC unit using the values currently stored in the sample buffer as a first input operand and the subset of the coefficients of the coefficients of the coefficient array as a second input operand.

Example 11 is the subject matter of any of Examples 1 to 10, wherein the digital filter can be a finite impulse response (FIR) filter.

Example 12 is the subject matter of any of Examples 1 to 10, wherein the digital filter can be an infinite impulse response (IIR) filter.

Example 13 is the subject matter of any of Examples 1 to 11, wherein the digital filter can be an N-tap digital filter, wherein a length of the sample buffer is N, wherein a length of the coefficient array is 2N-1 and wherein a length of the set of coefficients in the coefficient array is N and a length of the copy of the of the set of coefficients in the coefficient array is N-1.

Example 14 is the subject matter of any of Examples 1 to 11, wherein the set of coefficients can be arranged together sequentially in ascending or descending coefficient order in the coefficient array.

Example 15 is the subject matter of any of Examples 1 to 14, wherein obtaining the sample can include obtaining the sample from an analog-to-digital converter (ADC).

Example 16 is the subject matter of any of Examples 1 to 15, which can further include applying a reset to the digital filter including: storing reset values in the sample buffer; updating the buffer pointer to indicate a predefined reset position of the sample buffer; updating the coefficient array to indicate a predefined reset position of the coefficient array.

Example 17 is the subject matter of Example 16, wherein the buffer pointer can be updated to an end position of the sample buffer.

Example 1A is a non-transitory computer-readable medium including instructions configured to be executed by at least one processor and causes the at least one processor to perform a method for filtering a plurality of discrete samples, including:
wherein for each sample of a plurality of input samples, the at least one processor is configured to:
obtain a sample and store the sample as a value in a sample buffer at a position of the sample buffer indicated by a buffer pointer, the sample buffer being a circular buffer; calculate an output sample comprising to perform a multiply-accumulate (MAC) operation with values currently stored in the sample buffer and a subset of the coefficients stored in a coefficient array, wherein a position of the subset of coefficients in the coefficient array is indicated by a coefficient pointer; and update the buffer pointer and the coefficient pointer.

Example 2A is the subject matter of Example 1A, wherein the buffer pointer can indicate a position in the sample buffer including an oldest value of the sample buffer.

Example 3A is the subject matter of Example 1A or 2A, wherein to perform the MAC operation can further include to: multiply the values of the sample buffer respectively with the subset of coefficients to produce a plurality of multiplicative products, and sum the multiplicative products together to produce a filter output.

Example 4A is the subject matter of Example 3A, wherein to multiply the values of the sample buffer respectively with the subset of coefficients can include, for a plurality of iterations to: fetch one of the values from the sample buffer, fetch the corresponding coefficient for the fetched sample, and multiply the fetched sample with the fetched coefficient.

Example 5A is the subject matter of Example 4A, wherein for the plurality of iterations, an initially fetched value can be the value located at end position of the sample buffer and each subsequently fetched value can be located one position further away from the initially fetched value in the sample buffer, and an initially fetched coefficient can be the coefficient located at a position of the coefficient array indicated by the coefficient pointer, and wherein each subsequently fetched coefficient can be the coefficient located one position further away from the initially fetched coefficient in the coefficient array.

Example 6A is the subject matter of any of Examples 1A to 5A, wherein to update the buffer pointer can include to update the buffer pointer to indicate a position in the sample buffer that is one position further away from the previous position indicated by the buffer pointer, wherein each update of the buffer pointer can advance the position indicated by the buffer pointer in a first direction.

Example 7A is the subject matter of any of Examples 1A to 6A, wherein updating the coefficient pointer can include to: update the coefficient pointer to indicate a position in the coefficient array that is one position further away from the previous position indicated by the coefficient pointer when the previous position is not at an end position of the coefficient array and wherein each update advances the position indicated by the coefficient pointer in a second direction, and update the coefficient pointer to a predefined position when the previous position is at an end position of the coefficient array.

Example 8A is the subject matter of Example 7A, wherein the second direction can be a direction opposite to the first direction.

Example 9A is the subject matter of any of Examples 1A to 6A, wherein the copy of the set of coefficients can include all or less than all of the set of coefficients.

Example 10A is the subject matter of Example 1A, wherein to perform a multiply-accumulate (MAC) operation can include to perform the MAC operation with a MAC unit using the values currently stored in the sample buffer as a first input operand and the subset of the coefficients of the coefficients of the coefficient array as a second input operand.

Example 11A is the subject matter of any of Examples 1A to 10A, wherein the digital filter can be a finite impulse response (FIR) filter.

Example 12A is the subject matter of any of Examples 1A to 10A, wherein the digital filter can be an infinite impulse response (IIR) filter.

Example 13A is the subject matter of any of Examples 1A to 11A, wherein the digital filter can be an N-tap digital filter, wherein a length of the sample buffer is N, wherein a length of the coefficient array is 2N-1 and wherein a length of the set of coefficients in the coefficient array is N and a length of the copy of the of the set of coefficients in the coefficient array is N-1.

Example 14A is the subject matter of any of Examples 1A to 11A, wherein the set of coefficients can be arranged together sequentially in ascending or descending coefficient order in the coefficient array.

Example 15A is the subject matter of any of Examples 1A to 14A, wherein to obtain the sample can include to obtain the sample from an output of an analog-to-digital converter (ADC).

Example 16A is the subject matter of any of Examples 1A to 13A, wherein the at least one processor can be further configured to apply a reset to the digital filter including: store reset values in the sample buffer; update the buffer pointer to indicate a predefined reset position of the sample buffer; update the coefficient array to indicate a predefined reset position of the coefficient array.

Example 17A is the subject matter of Example 16A, wherein the buffer pointer can be updated to an end position of the sample buffer.

Example 1B is a device configured to filter a plurality of discrete samples including: at least one processor; a sample buffer configured to store samples, the sample buffer being a circular buffer; a coefficient array storing coefficients of a digital filter, wherein the coefficient array includes a set of coefficients for the digital filter and a copy of the set of coefficients; wherein for each sample of a plurality of input samples, the at least one processor is configured to obtain a sample and store the sample as a value in a sample buffer at a position of the sample buffer indicated by a buffer pointer; calculate an output sample comprising to perform a multiply-accumulate (MAC) operation with values currently stored in the sample buffer and a subset of the coefficients stored in a coefficient array, wherein a position of the subset of coefficients in the coefficient array is indicated by a coefficient pointer; and update the buffer pointer and the coefficient pointer.

Example 2B is the subject matter of Example 1B, wherein the buffer pointer can indicate a position in the sample buffer including an oldest value of the sample buffer.

Example 3B is the subject matter of Example 1B or 2B, wherein to perform the MAC operation can further include to: multiply the values of the sample buffer respectively with the subset of coefficients to produce a plurality of multiplicative products, and sum the multiplicative products together to produce a filter output.

Example 4B is the subject matter of Example 3B, wherein to multiply the values of the sample buffer respectively with the subset of coefficients can include, for a plurality of iterations to: fetch one of the values from the sample buffer, fetch the corresponding coefficient for the fetched sample, and multiply the fetched sample with the fetched coefficient.

Example 5B is the subject matter of Example 4B, wherein for the plurality of iterations: an initially fetched value can be located at end position of the sample buffer and each sample fetched after the initially fetched sample can be located one position further away from the initially fetched value in the sample buffer, an initially fetched coefficient can be the coefficient located at a position of the coefficient array indicated by the coefficient pointer, and wherein each coefficient fetched after the initially fetched coefficient can be located one position further away from the initially fetched coefficient in the coefficient array.

Example 6B is the subject matter of any of Examples 1B to 5B, wherein to update the buffer pointer can include to update the buffer pointer to indicate a position in the sample buffer that is one position further away from the previous position indicated by the buffer pointer, wherein each update of the buffer pointer can advance the position indicated by the buffer pointer in a first direction.

Example 7B is the subject matter of any of Examples 1B to 5B, wherein updating the coefficient pointer can include to: update the coefficient pointer to indicate a position in the coefficient array that is one position further away from the previous position indicated by the coefficient pointer when the previous position is not at an end position of the coefficient array and wherein each update advances the position indicated by the coefficient pointer in a second direction, and update the coefficient pointer to a predefined position when the previous position is at an end position of the coefficient array.

Example 8B is the subject matter of Example 7B, wherein the second direction can be a direction opposite to the first direction.

Example 9B is the subject matter of any of Examples 1B to 6B, wherein the copy of the set of coefficients can include all or less than all of the set of coefficients.

Example 10B is the subject matter of Example 1B, which can further include: a multiply-accumulate (MAC) unit, wherein to perform the multiply-accumulate (MAC) operation comprises the at least one processor to perform the MAC operation with the MAC unit using the values currently stored in the sample buffer as a first input operand and the subset of the coefficients of the coefficients of the coefficient array as a second input operand.

Example 11B is the subject matter of any of Examples 1B to 10B, wherein the digital filter can be a finite impulse response (FIR) filter.

Example 12B is the subject matter of any of Examples 1B to 10B, wherein the digital filter can be an infinite impulse response (IIR) filter.

Example 13B is the subject matter of any of Examples 1B to 11B, wherein the digital filter can be an N-tap digital filter, wherein a length of the sample buffer is N, wherein a length of the coefficient array is 2N-1 and wherein a length of the set of coefficients in the coefficient array is N and a length of the copy of the of the set of coefficients in the coefficient array is N-1.

Example 14B is the subject matter of any of Examples 1B to 11B, wherein the set of coefficients can be arranged together sequentially in ascending or descending coefficient order in the coefficient array.

Example 15B is the subject matter of any of Examples 1B to 14B, wherein to obtain the sample can include to obtain the sample provided from an output of an analog-to-digital converter (ADC).

Example 16B is the subject matter of Example 15B, wherein the ADC can be configured to provide input sample to at least one processor for digital filtering.

Example 17B is the subject matter of any of Examples 1B to 14B, wherein the at least one processor can be further configured to apply a reset to the digital filter including: store reset values in the sample buffer; update the buffer pointer to indicate a predefined reset position of the sample buffer; update the coefficient array to indicate a predefined reset position of the coefficient array.

Example 18B is the subject matter of Example 17B, wherein the buffer pointer can be updated to an end position of the sample buffer.

Example 19 is the subject matter of any of Examples 1B to 18B, wherein the at least one processor can include a digital signal processor (DSP).

It should be noted that one or more of the features of any of the examples above may be suitably or appropriately combined with any one of the other examples and that embodiments herein may be combined with each other.

The foregoing description has been given by way of example only and it will be appreciated by those skilled in the art that modifications may be made without departing from the broader spirit or scope of the invention as set forth in the claims. The specification and drawings are therefore to be regarded in an illustrative sense rather than a restrictive sense.

The scope of the disclosure is thus indicated by the appended claims and all changes which come within the meaning and range of equivalency of the claims are therefore intended to be embraced.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A device configured to filter a plurality of discrete samples comprising:
    at least one processor;
    a sample buffer coupled to the at least one processor and configured to store samples, the sample buffer being a circular buffer;
    a coefficient array coupled to the at least one processor and configured to store coefficients of a digital filter, wherein the coefficient array is configured to store a set of N coefficients for the digital filter and a copy set of coefficients, wherein the copy set of coefficients comprises at least a subset of the set of N coefficients;
    wherein for each sample of a plurality of input samples, the at least one processor is configured to:
        obtain a sample and store the sample as a value in the sample buffer at a position of the sample buffer indicated by a buffer pointer;
        calculate an output sample by performing a multiply-accumulate (MAC) operation based on values stored in the sample buffer and a subset of the coefficients stored in the coefficient array indicated by a coefficient pointer; and
        update the buffer pointer and the coefficient pointer.

2. The device of claim 1, wherein the copy set comprises a set of N-1 of the N coefficients.

3. The device of claim 1,
    wherein the at least one processor is configured to update the buffer pointer to indicate a position in the sample buffer that is one position away from a current position indicated by the buffer pointer;
    in a first direction.

4. The device of claim 3, wherein
    updating the at least one processor is configured to, when the current position indicated by the coefficient pointer is not at an end position of the coefficient array,
        update the coefficient pointer to indicate a position in the coefficient array that is one position away from the current position indicated by the coefficient pointer and wherein each update advances the position indicated by the coefficient pointer in a second direction, and
    when the current position is at an end position of the coefficient array, update the coefficient pointer to a predefined position.

5. The device of claim 4, wherein the first direction is different from the second direction.

6. The device of claim 1, wherein the digital filter is a finite impulse response (FIR) filter or an infinite impulse response (IIR) filter having N taps.

7. The device of claim 1, wherein the copy set comprises a set of all of the N coefficients.

8. The device of claim 1, wherein the at least one processor is further configured to:
    apply a reset to the digital filter comprising:
        storing reset values in the sample buffer;
        updating the buffer pointer to indicate a predefined reset position of the sample buffer; and
        updating the coefficient array to indicate a predefined reset position of the coefficient array.

9. The device of claim 1, wherein the at least one processor comprises a digital signal processor (DSP).

10. A method for filtering a plurality of discrete samples, comprising:
    providing a sample buffer configured to store N input samples, the sample buffer being a circular buffer;
    providing a coefficient array storing coefficients of a digital filter, wherein the coefficient array is configured to store a set of N coefficients for the digital filter and a copy set of coefficients, wherein the copy set of coefficients comprises at least a subset of the set of N coefficients;
    wherein for each sample of the plurality of discrete samples the method comprises:
        obtaining the sample and storing the sample as a value in the sample buffer at a position of the sample buffer indicated by a buffer pointer;
        calculating an output sample by performing a multiply-accumulate (MAC) operation with values currently stored in the sample buffer and a subset of the coefficients stored in the coefficient array indicated by a coefficient pointer; and
        updating the buffer pointer and the coefficient pointer.

11. The method of claim 10,
    wherein the buffer pointer indicates a position in the sample buffer including an oldest value of the sample buffer.

12. The method of claim 10, wherein the copy set comprises a set of N-1 of the N coefficients.

13. The method of claim 10, wherein the copy set comprises a set of all N of the N coefficients.

14. The method of claim 10,
wherein updating the buffer pointer comprises updating the buffer pointer to indicate a position in the sample buffer that is one position away from the current position indicated by the buffer pointer, in a first direction.

15. The method of claim 14, wherein updating the coefficient pointer comprises:
when the current position is not at an end position or boundary of the coefficient array and wherein the updating occurs in a second direction, updating the coefficient pointer to indicate a position in the coefficient array that is one position further away from the current position indicated by the coefficient pointer in a second direction, and
when the current position is at an end of the coefficient array, updating the coefficient pointer to a predefined position,
wherein the second direction is a direction opposite to the first direction.

16. The method of claim 10,
wherein the digital filter is N-tap digital filter,
wherein a length of the coefficient array is 2N-1 and wherein a length of the set of coefficients in the coefficient array is N and a length of the copy set of coefficients in the coefficient array is N-1.

17. A non-transitory computer-readable medium including instructions configured to be executed by at least one processor to cause the at least one processor to perform operations, the operations comprising:
for each sample of a plurality of input samples,
obtaining a sample and storing the sample as a value in a sample buffer at a position of the sample buffer indicated by a buffer pointer, the sample buffer being a circular buffer having N positions;
calculating an output sample by performing a multiply-accumulate (MAC) operation based on values currently stored in the sample buffer and a subset of coefficients stored in a coefficient array indicated by a coefficient pointer, wherein the coefficient array is configured to store a set of N coefficients for a digital filter and a copy set of coefficients, wherein the copy set of coefficients comprises at least a subset of the set of N coefficients; and
updating the buffer pointer and the coefficient pointer.

18. The non-transitory computer-readable medium of claim 17,
wherein the digital filter is N-tap digital filter,
wherein a length of the coefficient array is 2N-1 and wherein a length of the set of coefficients in the coefficient array is N and a length of the copy set of coefficients in the coefficient array is N-1.

19. The non-transitory computer-readable medium of claim 17,
wherein updating the buffer pointer comprises updating the buffer pointer to indicate a position in the sample buffer that is one position away from the current position indicated by the buffer pointer in a first direction.

20. The non-transitory computer-readable medium of claim 19,
wherein updating the coefficient pointer comprises:
when the current position is not at an end position or boundary of the coefficient array and wherein the updating occurs in a second direction, updating the coefficient pointer to indicate a position in the coefficient array that is one position further away from the current position indicated by the coefficient pointer in a second direction, and
when the current position is at an end position of the coefficient array, updating the coefficient pointer to a predefined position,
wherein the second direction is a direction opposite to the first direction.

* * * * *